(12) United States Patent
Wollitzer et al.

(10) Patent No.: US 12,047,126 B1
(45) Date of Patent: Jul. 23, 2024

(54) DATA TRANSMISSION SYSTEM

(71) Applicant: Rosenberger Hochfrequenztechnik GmbH & Co. KG, Fridolfing (DE)

(72) Inventors: Michael Wollitzer, Fridolfing (DE); Helmut Reiter, Waging am See (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 18/010,879

(22) PCT Filed: Jun. 16, 2021

(86) PCT No.: PCT/EP2021/066219
§ 371 (c)(1),
(2) Date: Jan. 4, 2024

(87) PCT Pub. No.: WO2021/259727
PCT Pub. Date: Dec. 30, 2021

(30) Foreign Application Priority Data

Jun. 24, 2020 (EP) .................................... 20182053

(51) Int. Cl.
*H04B 3/52* (2006.01)
*F21V 21/005* (2006.01)
(Continued)

(52) U.S. Cl.
CPC ............ *H04B 3/52* (2013.01); *F21V 21/005* (2013.01); *F21V 21/35* (2013.01); *H01R 25/14* (2013.01); *H04B 3/54* (2013.01)

(58) Field of Classification Search
CPC ... H04B 3/00; H04B 3/50; H04B 3/52; H04B 3/54; H04B 5/00; H04B 5/24; H04B 5/48;
(Continued)

(56) References Cited

U.S. PATENT DOCUMENTS 6,292,901 B1 * 9/2001 Lys ..................... H05B 47/18
713/300
10,673,116 B2   6/2020 Henry
(Continued)

OTHER PUBLICATIONS

ETC. "DataTrack" Datasheet, https://protolight.com/files/2019/08/ETC-DataTrack_Datasheet.pdf Public availability as of Jan. 17, 2020 confirmed by web.archive.org, retrieved on May 17, 2024 (Year: 2020).*
(Continued)

*Primary Examiner* — David S Huang
(74) *Attorney, Agent, or Firm* — Randall Danskin P.S.

(57) ABSTRACT

A data transmission system having a data transmission channel (2; 21, 22) and a plurality of transmission and receiving units. The data transmission channel is an electric line which has a busbar made of an electrically insulating material and at least one electric conductor. Each of the at least one electric conductor runs in the direction of the longitudinal axis of the busbar. The lateral surface of the busbar is surrounded by one of the electric conductors and/or the busbar spaces apart at least two of the electric conductors from each other. The plurality of transmission and receiving units are arranged along the busbar, and each of the plurality of transmission and receiving units is designed to couple an electromagnetic wave into the electric line or couple an electromagnetic wave out of the electric line.

14 Claims, 6 Drawing Sheets

(51) Int. Cl.
  *F21V 21/35* (2006.01)
  *H01R 25/14* (2006.01)
  *H04B 3/54* (2006.01)

(58) Field of Classification Search
  CPC .......... H01R 9/26; H01R 9/22; H01R 9/2675;
      H01R 13/6633; H01R 25/14; F21V
      21/35; F21V 21/005
  See application file for complete search history.

(56) References Cited

U.S. PATENT DOCUMENTS

| 2008/0302033 | A1* | 12/2008 | Insalaco | ................... | B66C 7/04 |
| | | | | | 52/220.2 |
| 2011/0181200 | A1* | 7/2011 | Luk | ....................... | H05B 45/20 |
| | | | | | 315/294 |
| 2013/0044501 | A1* | 2/2013 | Rudisill | .................. | F21V 29/70 |
| | | | | | 362/398 |
| 2017/0018833 | A1 | 1/2017 | Henry | | |
| 2018/0139823 | A1* | 5/2018 | Hick | ....................... | H05B 47/11 |

OTHER PUBLICATIONS

European Search Report dated Dec. 18, 2022.
European Office Action dated Apr. 26, 2022.

* cited by examiner

DATA TRANSMISSION SYSTEM

CROSS-REFERENCE TO RELATED APPLICATIONS

This US National Stage Non-Provisional patent application claims priority to earlier filed PCT Patent Application No. PCT/EP2021/066219 which was filed on 16 Jun. 2021 and also claims priority to still earlier filed European Patent Application No. EP 20 182 053.7 which was filed on 24 Jun. 2020. The entire contents of both earlier filed PCT Patent Application No. PCT/EP2021/066219 and still earlier filed European Patent Application No. EP 20 182 053.7 are both expressly and fully incorporated herein by this reference.

Pursuant to USPTO rules, this priority claim to earlier filed PCT Patent Application No. PCT/EP2021/066219 which was filed on 16 Jun. 2021 and to still earlier filed European Patent Application No. EP 20 182 053.7 which was filed on 24 Jun. 2020 are both included in the Application Data Sheet (ADS) filed with this application.

FIELD OF INVENTION

The present invention relates to a data transmission system.

BACKGROUND OF THE INVENTION

Lighting systems based on rails have long been used in the private and commercial sectors.

The individual luminaires are each fastened along the rail typically by means of the luminaire or the luminaire holder being clicked in on the rail profile. Electrical lines for supplying power to the individual luminaires using the required single-phase or polyphase AC voltage from the power supply system, for example 230 V AC, are laid in the rail in touch-safe fashion. For driving the luminaires, for example for dimming the luminaires, additional electrical lines for DC voltage, for example 42 V DC, or a data bus having a low data transmission rate is/are laid in the rail. The rail system is typically mechanically fastened to a ceiling of a room or a hall and electrically connected to the associated DC-voltage and AC-voltage lines of the building installation.

Data transmission within buildings between various items of terminal equipment, for example servers, printers, etc. typically takes place via cables. Ethernet in accordance with IEEE 802.3 has been established as the data transmission standard within buildings. When using optical waveguides, in this case data transmission rates up to in the three-digit Gbit/s range can be realized. The transmission of the data between two items of terminal equipment takes place in the case of Ethernet via a data cable laid in each case between the two items of terminal equipment (so-called peer-to-peer transmission). As an alternative, the data transmission takes place in the case of Ethernet via individual routers or switches, to which the individual items of terminal equipment are connected in each case via a data cable, and via data cables laid between the individual routers or switches. In both cases, the volume of data cabling within a building and therefore the amount of space and energy required for this as well as the complexity involved in the planning and installation and start-up of the building cabling has markedly increased.

This is a state which needs to be improved.

DESCRIPTION OF THE INVENTION

Against this background, the present invention is based on the object of providing a data transmission system within buildings in which the volume of data lines, in particular the total length volume of data lines, is optimized in respect of reduced space and energy requirement.

A data transmission system having a data transmission channel, and a plurality of transmission and reception units, wherein the data transmission channel is an electrical line, which has a rail consisting of an electrically insulating material, and at least one electrical conductor, wherein the rail is surrounded on the lateral surface side by one of the electrical conductors (the at least one electrical conductor) and/or the rail spaces apart in each case at least two of the electrical conductors (the at least one electrical conductor) from one another, wherein the plurality of transmission and reception units is arranged along the rail, and wherein the plurality of transmission and reception units is in each case designed to couple an electromagnetic wave into the electrical line or to couple it out of the electrical line.

The finding/concept on which the present invention is based consists in providing a data transmission channel for a data transmission between a plurality of items of terminal equipment, preferably markedly more than two items of terminal equipment. For this purpose, an electrical data transmission channel is used between a plurality of transmission and reception units, which each belong to an item of terminal equipment. The data transmission channel comprises a rail consisting of an electrically insulating material and at least one electrical conductor. The at least one electrical conductor in this case extends in each case along the entire longitudinal extent of the dielectric rail.

In order to enable propagation of an electromagnetic wave in such a data transmission channel, the electrically insulating rail is surrounded, in a first embodiment of the data transmission channel, on the lateral surface side by an electrical conductor. A dielectric rail whose outer surface is coated on the lateral surface side by a metal coating enables the propagation of an electromagnetic wave, in particular a TEM wave, in both longitudinal axis directions of the rail.

In a second embodiment of the data transmission channel, two electrical conductors are arranged within the dielectric rail which are arranged so as to be spaced apart from one another by the dielectric rail. Likewise, an electromagnetic wave, in particular a TEM wave, can propagate in both longitudinal axis directions of the rail between the two electrical conductors. In particular, it is possible for a radiofrequency electromagnetic wave to propagate in the differential mode which corresponds to a differential radiofrequency signal.

In a third embodiment of the data transmission channel, in addition to the second embodiment, the dielectric rail is coated on the lateral surface side by a metal coating. In such a data transmission channel, two modes of an electromagnetic wave can propagate, namely a common mode and a differential mode. The two electrical conductors within the dielectric rail form the two inner conductors, and the coating on the lateral surface forms the outer conductor of the data transmission channel. By virtue of the outer conductor coating, the guidance of the electromagnetic wave is improved and the extent of the leakage field around the signal conductor is reduced. Therefore, the transmission frequency of the electromagnetic wave can be increased.

In a fourth embodiment of the data transmission channel, an electrical conductor runs within the dielectric rail, while the dielectric rail is coated on the lateral surface side by a metal coating. In this way, a transmission channel having a coaxial structure comprising inner and outer conductors is formed which enables propagation of a mode of a radiofrequency electromagnetic wave in both longitudinal axis directions of the rail.

In addition, a transmission channel having a plurality of electrical individual conductors and/or having a plurality of pairs of electrical conductors is also conceivable. The pairs of electrical conductors are in each case arranged within the dielectric rail either parallel to one another or crossed over with respect to one another. In the event of the presence of an outer conductor, a number of modes of an electromagnetic wave which corresponds to the number of inner conductors can propagate in such a transmission channel.

In all embodiments of a transmission channel, a radiofrequency electromagnetic wave can propagate along the rail. The radiofrequency electromagnetic wave is in this case guided along the rail.

In comparison to free-space path loss of an electromagnetic wave, in the case of free-space propagation over a radio channel the transmission loss of an electromagnetic wave in the rail-based data transmission system is lower for a longitudinal extent of the rail of a few 100 m. Owing to the guidance of the electromagnetic wave along the rail, the coupling loss between adjacent rail-based data transmission systems is higher than in the case of adjacent radio communication networks. Therefore, the minimum possible spacing between two rail-based data transmission systems is smaller than in the case of adjacent radio communication networks.

The realizable frequency range of the radiofrequency electromagnetic wave which propagates on a rail can be increased by virtue of the outer conductor coating of the dielectric rail. In this case, radiofrequency is preferably understood to mean a frequency range between 1 MHz and 500 GHz, particularly preferably a frequency range between 10 MHz and 20 GHz and very particularly a frequency range between 500 MHz and 6 GHz.

The metal outer conductor coating of the dielectric rail is preferably electrically connected to a reference potential, preferably a ground potential, of the transmission and reception units. In order to couple an electromagnetic wave in or out via field coupling, the electrically conductive coating is in each case preferably exposed in the region of the transmission and reception units. Galvanic coupling in or out of an electromagnetic wave via the outer conductor shielding of the dielectric rail can also be realized, however.

If the individual transmission and reception units are in each case arranged along the rail and are in each case designed to couple an electromagnetic wave into the electrical line or to couple an electromagnetic wave out of the electrical line, a TEM wave with data can be fed into the transmission channel by a transmission and reception unit, and this TEM wave propagating over the transmission channel can be fed out of the transmission channel by another transmission and reception unit.

If the individual transmission and reception units are positioned in each case at various locations in a building and are arranged on the common rail, in this way data transmission between a plurality of items of terminal equipment is possible. The electrical line length of such a data transmission system is restricted to the longitudinal extent of the rail. This data transmission is reduced in comparison with the summated electrical line length of a peer-to-peer transmission or a transmission via routers or switches given the same number of items of terminal equipment.

Such a data transmission system can be used, for example, in open-plan offices, manufacturing and storage halls, logistics centers, supermarkets and malls. The longitudinal extent of such a rail-based data transmission system is preferably greater than 5 m and less than 500 m, in particular preferably greater than 10 m and less than 300 m and very particularly preferably greater than 20 m and less than 100 m.

The rail-based data transmission system can be used for transmitting data between a plurality of items of terminal equipment which are each coupled to the rail-based transmission channel via a transmission and reception unit. The items of terminal equipment can in the simplest case be sensors having integrated sensor signal processing, for example a thermal sensor or a surveillance camera, or actuators having integrated drive electronics, for example a servomotor for opening or closing a window. The items of terminal equipment can also have a higher technical functionality, such as, for example, a printer, a personal computer or a data acquisition device. It is also conceivable to link components such as radio access points via the rail system.

Alternatively, in addition to the individual transmission and reception units, one or more luminaires can also be arranged on the rail-based data transmission system. For this purpose, in addition to the electrical conductors in each case acting as data lines, further electrical lines need to be integrated in the electrically insulating rail for supplying voltage to and driving the individual luminaires. However, the luminaires can also be integrated, in the same way as the items of terminal equipment, in the rail-based data transmission system via associated transmission and reception units. It is furthermore conceivable for in each case data signals to additionally be transmitted on electrical conductors for power supply purposes.

The transmission and reception unit can either be integrated in the associated item of terminal equipment or separated from the associated item of terminal equipment and connected thereto via a wireless data link or a hardwired data link. It is also conceivable that a plurality of items of terminal equipment are connected to a common transmission and reception unit.

The individual transmission and reception units are preferably positioned directly adjacent to the electrically insulating rail and mechanically connected directly to the rail. In analogy to the fastening of a luminaire on a rail, a click mechanism can be used as the mechanical fixing, in which, for example, one or more latching hooks or the like of the transmission and reception unit latches in each case into a corresponding latching cutout or latching groove in the rail. As an alternative, a screw joint or adhesive bond or another suitable connection is also possible. The individual transmission and reception unit can, however, also be fastened to the rail in a manner so as to be spaced apart from the rail via an additional apparatus. It is also conceivable for a subregion of the transmission and reception unit to protrude into the rail via a cutout provided in the rail. The individual transmission and reception units can be arranged distributed at corresponding axial positions over the entire longitudinal extent of the rail, depending on the spatial positioning of the associated items of terminal equipment within the building. It is also possible to realize positioning of a plurality of transmission and reception units, preferably of two transmission and reception units, in the same axial position of the rail.

The transmission and reception unit can contain typical analog components or functional units for transmitting and receiving such as amplifiers, filters, mixers etc., and combined digital-analog functional units such as analog-to-digital converters or digital-to-analog converters. Furthermore, a transmission and reception unit can contain all conventional digital signal-processing functional units for transmitting and receiving such as, for example, (de)modulation, (de)coding, signal equalization, etc. The digital signal-processing functional units can be implemented in software or hardware (for example FPGA or ASIC).

The electrically insulating rail is preferably produced by means of an extrusion process from a dielectric material. Suitable dielectric materials for this are the conventional dielectric materials for electrical insulation with as few dielectric losses as possible such as, for example, polypropylene, polyethylene, polytetrafluoroethylene (PTFE) etc. In this case and in the text which follows, a rail is understood to mean a rigid body whose longitudinal extent is a multiple of its transverse extent. A rail preferably has a constant cross-sectional profile over its entire longitudinal extent. The longitudinal extent of the rail is limited and finite.

The electrically insulating rail preferably has a straight longitudinal extent. As an alternative, however, a rail with a curved or bent longitudinal extent profile is also conceivable. The curvature or the bend can in this case be formed over the entire longitudinal extent or over one or more subsections of the longitudinal extent.

The cross-sectional profile of the electrically insulating rail can be formed in all conventional and technically sensible profile forms. In the case of an electrically insulating rail having a single electrical conductor arranged within the rail and an electrical conductor in the form of an electrically conductive coating on the outer surface of the rail, a round cross-sectional profile is advantageous for realizing a coaxial structure. Aside from this, however, a square, rectangular, triangular, polyangular or polygonal, oval or elliptical cross-sectional profile or the like is also possible. The choice of cross-sectional profile is rather more dependent on the number and arrangement of the electrical conductors arranged within the rail.

The profile of the rail can preferably also have cavities over its entire longitudinal extent.

The at least one electrical conductor can preferably in each case be in the form of a metal rail. As an alternative, an embodiment as a round wire or as square wire is also possible. Preferably, the individual electrical conductors within the dielectric rail are produced in a common extrusion process.

As an alternative, in the extrusion process in each case cavities, i.e. bushings, or cutouts can be formed in the dielectric rail for the individual electrical conductors over the entire longitudinal extent of the rail. After or during the extrusion process, the individual electrical conductors are inserted into these bushings or cutouts and fixed to the rail.

The mechanical fastening of each electrical conductor in the dielectric rail can take place in a force-fitting manner by means of a press fit in the associated cutout or bushing. As an alternative, a materially bonded joint by means of adhesive bonding, for example, is conceivable. A form-fitting connection is also possible when the axial ends of the rail can be closed by in each case one cap. A further possible form-fitting connection is conceivable when the axial ends of the individual electrical conductors which protrude beyond the axial ends of the rail are preferably reshaped through, for example, 90° by means of a thermal process.

If the position of the individual electrical conductors within the dielectric rail is accessible from outside the rail, for example in the case of the formation of a groove-shaped cutout over the entire longitudinal extent of the rail, the individual electrical conductor can also be constructed on the dielectric rail by means of a coating process.

Conventional materials such as, for example, copper or brass can be used as the metal materials for the electrical conductors within the dielectric rail. With a view to achieving low line losses, the electrical conductors should be provided with a surface coating having very good electrical conductivity and having a thickness which is matched to the frequency of the signals to be transmitted.

The signal conductors generate, together with the dielectric rail and the metal border, a waveguide having a predetermined wave impedance which is homogeneous over the line length.

Advantageous configurations and developments can be gleaned from the description herein with reference to the figures in the drawings, and to the claims.

It goes without saying that the abovementioned features and the features yet to be explained herein can be used not only in the respectively cited combination but also in other combinations or on their own without departing from the scope of the present invention.

In a preferred embodiment of the invention, all of the transmission and reception units each feed an electromagnetic wave into the electrical line or out of the electrical line by means of field coupling. For this purpose, each transmission and reception unit is coupled to the rail-based data transmission channel via an associated coupling apparatus. Since the individual coupling apparatuses can each be configured in reflection-minimized fashion, in the case of an impedance-matched termination of the axial ends of the rail-based data transmission channel, the reflection of the electromagnetic wave in the data transmission channel can be markedly reduced.

If the data transmission between two transmission and reception units takes place via an interposed transmission and reception unit, which is preferably positioned in the center of the data transmission channel and acts as access point, the transmission and reception unit acting as access point can also be coupled to the data transmission channel via a galvanic coupling, as an alternative to the field coupling. The transmission and reception unit acting as access point is active either as transmitter or as receiver on each data transmission in the rail-based data transmission channel. Therefore, the electrical conductors which connect the transmission and reception unit acting as access point to the electrical conductors of the rail-based data transmission channel in the case of a galvanic coupling do not represent electrical spurs of the data transmission channel. The galvanic coupling is therefore configured in reflection-minimized fashion as the alternative field coupling in the case of the transmission and reception unit acting as access point.

Each electrical conductor running within the dielectric rail is connected to the transmission and reception unit acting as access point in each case via two electrical conductors in the case of galvanic coupling. The two electrical conductors of the galvanic coupling are connected to the associated electrical conductor of the rail-based data transmission channel with an axial spacing of $\lambda/4 \cdot (2n+1)$, preferably $\lambda/4$. In this case, $\lambda$ is the wavelength of the electromagnetic wave propagating in the data transmission channel and n is a non-negative integral factor.

In a further preferred embodiment of the invention, the dielectric rail has a cutout along its longitudinal extent, in analogy to the rail system for luminaires. This cutout preferably extends over the entire longitudinal extent and preferably has a rectangular cross-sectional profile. However, other technically sensible cross-sectional profiles are also conceivable, for example a triangular or a polygonal cross-sectional profile. The cutout is used firstly for mechanically fastening the individual transmission and reception units to the rail, for mechanically fastening the rail to the building, preferably to a room or hall ceiling, and for arranging or guiding the individual electrical conductors.

The mechanical fastening of the individual transmission and reception units to the rail and the rail to the building is not essential to the invention. It can be achieved using fastening techniques which are conventional in the art.

The individual electrical conductor is preferably arranged on the base of the cutout and fastened in or on the dielectric rail. If two or more electrical conductors are arranged within the dielectric rail, they are to be arranged suitably spaced apart from one another on the base of the cutout and to be fastened to the dielectric rail. The individual electrical conductors can alternatively be guided in each case in an associated groove and connected to the dielectric rail in form-fitting, force-fitting or materially bonded fashion. The individual grooves can preferably be formed in the side walls and/or base of the cutout. Next to the grooves for the electrical conductors for data transmission, additional grooves can be provided in the cutout in the dielectric rail for further electrical conductors for supplying voltage to the individual transmission and reception units and the individual luminaires. The individual electrical conductors can also be guided completely in the dielectric region of the rail, however, and therefore are arranged neither in the cutout nor in a groove adjoining the cutout.

If a dielectric rail having a cutout in the longitudinal axis direction also has, in addition to an inner conductor, a metal outer conductor coating on the lateral surface, a data transmission channel having a "quasi-coaxial" cross-sectional profile is present. A radiofrequency electromagnetic wave up to in the GHz range can propagate in such a "quasi-coaxial" data transmission channel as well.

The feeding of an electromagnetic wave between each transmission and reception unit into and out of the data transmission channel preferably takes place electromagnetically via a coupling apparatus. Such field coupling occurs when the electrical variables are no longer stationary, but rather time-variable, i.e. preferably greater than 1 MHz. In this case, the electrical and magnetic fields occur no longer in detached fashion but now only in combined form in the form of electromagnetic fields.

A coupling apparatus, when it is not positioned at the axial ends of the rail-shaped data transmission channel, can in principle couple or transmit an electromagnetic wave into the data transmission channel in both longitudinal axis directions of the rail. The coupling apparatus is used for near-field coupling with the RF transmission channel in both coupling directions, i.e. feeding in or transmitting and feeding out or receiving.

Owing to reflections in the data transmission channel, superimposition of the reflections which interfere with one another results along the electrical line. The coupled-in radiofrequency electromagnetic wave is split up owing to the reflections into a large number of wave components. Each reflected electromagnetic wave therefore propagates over a different path and therefore experiences a different amplitude and phase distortion. A radiofrequency electromagnetic wave from the superimposition of a plurality of electromagnetic wave components which are amplitude- and phase-distorted in each case differently in the paths of different lengths is received. In this case, depending on the individual paths and the frequency of the electromagnetic wave, a destructive interference may arise which disadvantageously becomes apparent as fading in a certain frequency range. This destructive superimposition of interfering reflections within the dielectric rail system can therefore be considered similarly to the superimposition of electromagnetic waves in a mobile multiway transmission channel. In order to improve a signal equalization of the received radiofrequency RF signal in the receiver, advantageously so-called spatial multiplexing is used whilst utilizing spatial diversity.

A coupling apparatus with which a spatial diversity is used preferably comprises a plurality of coupling elements each having an electrical terminal and/or at least one spatially extended coupling element each having two electrical terminals for feeding in and out an electromagnetic wave. Each electrical terminal of a coupling element is in each case electrically connected to the transmission and reception unit belonging to the coupling apparatus. An RF signal is fed into the coupling apparatus by the transmission and reception unit or an RF signal is fed out of the coupling apparatus into the transmission and reception unit via the electrical terminal of the coupling element. Therefore, a Multiple-Input Multiple-Output transmission system (MIMO transmission system) can be realized with an arrangement comprising such a rail-based data transmission channel and a coupling apparatus with such a design. In combination with a MIMO equalization yet to be explained in detail further below, advantageously reception signals distorted in such a way can be equalized with a good equalization quality.

For a rail-based transmission channel having two electrical conductors, preferably a 2×2 MIMO structure having a coupling apparatus comprising two coupling elements each having an electrical terminal or a spatially extended coupling element having two electrical terminals needs to be developed which are each used bidirectionally for feeding in/transmitting and feeding out/receiving. In the case of a plurality of electrical conductors in the rail having a higher number of propagation-capable modes, the order of the MIMO structure can also be higher, for example a 3×3 MIMO structure, a 4×4 MIMO structure or generally an n×n MIMO structure (n is in this case a natural number). The maximum sensible number of electrical terminals corresponds to twice the number of modes to be transmitted in the rail system. The summated number of electrical terminals of all of the coupling elements contained in each case in the coupling apparatus which are used in each case for coupling in and out an electromagnetic wave or an electrical signal corresponding thereto does not need to correspond to the order of the MIMO structure in each coupling apparatus, but rather can also be smaller in the case of some coupling apparatuses.

In each case one unit for MIMO equalization and one unit for MIMO driving is provided in each transmission and reception unit, with each of these units for MIMO equalization and for MIMO driving being connected to the electrical terminals of the coupling elements of the coupling apparatus belonging to the transmission and reception unit via interposed analog and/or digital signal-processing units.

In the unit for MIMO equalization, a reconstruction of the data of the RF signals which are transmitted by the transmitting transmission and reception unit takes place. Using spatial diversity, in this case the distortion of the transmitted RF signals owing to the different propagation paths in the rail-based transmission system is equalized. The diversity is realized by a multiple-antenna arrangement on the transmitter and receiver side. The multiple-antenna arrangement is formed by a coupling apparatus on the transmitter and receiver side having a plurality of coupling elements. These coupling elements have either in each case one electrical terminal for the associated transmission and reception unit or in each case two electrical terminals for the associated transmission and reception unit. For MIMO equalization, conventional MIMO equalization methods can be used.

In the unit for MIMO driving, substantially the radiofrequency electrical signals are generated which are supplied to the individual electrical terminals of the coupling apparatus. For this purpose, the data to be transmitted are distributed, corresponding to the MIMO transmission method used, among the individual radiofrequency electrical signals and modulated onto the radiofrequency electrical signals. In each case radiofrequency electrical signals each having different data can be supplied to the individual electrical terminals of the coupling apparatus via the unit for MIMO driving. As an alternative, it is also possible to supply in each case one identical or different linear combination of radiofrequency individual signals having all the data to the individual electrical terminals of the coupling apparatus. In a rarer application, in each case also an identical radiofrequency electrical signal having in each case identical data can be supplied to the individual electrical terminals of the coupling apparatus.

The coupling apparatus can, in a first variant, be designed in accordance with the principle of a directional coupler. The coupling apparatus belonging in each case to the individual transmission and reception unit comprises a first electrical conductor of the directional coupler, while the electrical conductor within the rail forms a second electrical conductor of the directional coupler. The coupling apparatus and the associated electrical conductor in the dielectric rail are therefore the two coupling partners of the directional coupler.

In order to realize a 2×2 MIMO structure, the coupling apparatus consequently comprises a coupling element, which is connected to two electrical terminals for the electrical link to the transmission and reception unit. In each case electrical signals are fed from a unit for MIMO driving of the transmission and reception unit into the coupling apparatus or fed out of the coupling apparatus into a unit for MIMO equalization of the transmission and reception unit via these two electrical terminals.

In order to implement a high coupling factor and at the same time a high return loss to the electrical conductor in the rail, the coupling element of the coupling apparatus needs to be positioned suitably with respect to the electrical conductor in the rail and dimensioned suitably.

In order to achieve coupling with a high coupling factor, the coupling apparatus can be positioned directly on the dielectric rail without forming a cutout. The outer conductor coating is preferably exposed in the region of the coupling apparatus for this purpose. The coupling apparatus preferably protrudes into a cutout, however, which is formed in the dielectric rail in order to increase the coupling factor of the electromagnetic wave within the waveguide.

Since only a very small proportion of the power of the electromagnetic wave which is transmitted in the longitudinal axis direction of the rail is coupled out to the transmission and reception unit via the coupling apparatus, the transmission loss of the rail-based data transmission system in the region of the coupling apparatus performing the coupling-out process has only a comparatively small dip. Furthermore, the coupling of the coupling apparatus to the electromagnetic wave transmitted on the rail, which coupling should be dimensioned so as to be suitably weak, only generates weak reflections, with the result that even in the case where a plurality of coupling apparatuses is fitted along the rail, the signal transmission is impaired only to a slight extent.

The coupling apparatus furthermore comprises an outer conductor coupling between the outer conductor coating of the rail and a reference potential terminal of the respective transmission and reception unit. This outer conductor coupling can preferably take place by means of galvanic coupling, for example by means of the coupling elements of the coupling apparatus being provided with a metal covering, or alternatively by means of capacitive coupling.

In a second variant, the coupling apparatus can also contain coupling elements for an electrical field, i.e. E field coupling elements, and/or coupling elements for a magnetic field, i.e. H field coupling elements. An E field coupling element is preferably in the form of a small monopole antenna or a small dipole antenna, while an H field coupling element is preferably in the form of small loop antennas. The E field coupling element has an electrical terminal which is electrically connected to the transmission and reception unit for feeding in or out an electrical signal. The H field coupling element has an electrical terminal which is electrically connected to the transmission and reception unit for feeding in or out an electrical signal. The other electrical terminal of the H field coupling element is connected to the ground terminal of the transmission and reception unit and/or to the outer conductor coating of the dielectric rail and is not used for feeding in or out an electrical signal with the transmission and reception unit. Therefore, both the E field coupling element and the H field coupling element are designed to be bidirectional for feeding in/transmitting and for feeding out/receiving an electromagnetic wave in the near field.

For a 2×2 MIMO structure, either two E field coupling elements or two H field coupling elements are required. The combination of one E field coupling element and one H field coupling element is also conceivable for a coupling apparatus with a 2×2 MIMO structure. The E and/or H coupling elements in this case need to be arranged with a longitudinal spacing, which is predetermined by the wave mechanics, with respect to one another along the electrical line. For a higher order of the MIMO structure, the number of E field coupling elements and/or H field coupling elements needs to be increased correspondingly.

The individual E field or H field coupling elements likewise need to be dimensioned correspondingly with respect to a high coupling factor and at the same time a high reflection loss and to be arranged correspondingly in a cutout within the dielectric rail. As regards the outer conductor coupling, that which has been stated above in respect of the coupler apparatus in accordance with the directional coupler principle applies equivalently.

The radiofrequency electrical signals which are fed into the electrical terminals of the E field coupling elements or H field coupling elements by the unit for MIMO driving are in each case coupled into electromagnetic waves in the rail-based data transmission channel which propagate in both longitudinal axis directions of the rail. The electromagnetic waves which are coupled out of the E field coupling elements or the H field coupling elements in each case and which result from a superimposition of interfering reflections of the individual electromagnetic waves are supplied to the unit for MIMO equalization as corresponding radiofrequency electrical signals. In the unit for MIMO equalization, the equalization and the reconstruction of the two radiofrequency electrical signals which are transmitted by another transmission and reception unit takes place.

In order to improve the equalization quality in the MIMO equalization further still, advantageously beamforming is used. For this purpose, the individual transmission and reception unit transmits in each case different RF signals in the two longitudinal axis directions of the rail:

For a coupling apparatus which functions in accordance with the directional coupler principle, for this purpose in each case one different radiofrequency electrical signal, i.e. in each case one radiofrequency electrical signal onto which different data have been modulated, needs to be fed into the two electrical terminals of the coupling element in the transmission mode of the unit for MIMO driving of the transmission and reception unit. The two RF signals each having different data are, owing to the directional action of the coupling apparatus, in each case radiated into a radiofrequency electromagnetic wave, which in each case propagates in a different longitudinal axis direction of the rail. In the reception mode, in each case the electromagnetic waves propagating out of the two longitudinal axis directions of the rail system are in each case coupled out separately at the two electrical terminals of the coupling element owing to the directional action of the coupling apparatus and are therefore supplied to the unit for MIMO equalization of the transmission and reception unit separately.

In order to couple in electromagnetic waves having different data contents in the two longitudinal axis directions of the rail, two E field coupling elements are required in a coupling apparatus having E field coupling elements. The two E field coupling elements are spaced apart from one another with an axial spacing of $\lambda/4 \cdot (2n+1)$, preferably $\lambda/4$, along the longitudinal axis of the rail. In this case, $\lambda$ is the wavelength of the electromagnetic wave propagating in the data transmission channel and n is an integral non-negative factor. The unit for MIMO driving is designed to inject in each case a first electrical signal and a second electrical signal into the electrical terminal of the two E field coupling elements. The first electrical signal injected at one E field coupling element has a phase lag through 90° with respect to the first electrical signal injected at the other coupling element, and the second electrical signal injected at the other E field coupling element has a phase lag through 90° with respect to the second electrical signal injected at the first E field coupling element.

When two radiofrequency electromagnetic waves each having different data which propagate in different longitudinal axis directions of the rail are coupled out, the two E field coupling elements each having an electrical terminal of the coupling apparatus can be used which are already used for the coupling-in of electromagnetic waves having different data contents in the two longitudinal axis directions. The electrical terminals of the two E field coupling elements are connected to a unit for MIMO equalization of the transmission and reception unit. The unit for MIMO equalization is designed to reconstruct the two electrical signals, which are in each case coupled into the associated coupling apparatus by another transmission and reception unit, from the electrical signals, which are fed out in each case at the electrical terminals of the two E field coupling elements, by means of a MIMO equalization method.

If two H field coupling elements are used in the coupling apparatus instead of two E field coupling elements, the procedure for transmitting or receiving two different RF signals in the two longitudinal axis directions of the rail is equivalent to in the case of two E field coupling elements.

Finally, a coupling apparatus having one E field coupling element and one H field coupling element is also possible.

In order to feed electromagnetic waves having different data into different longitudinal axis directions of the rail or to feed them out of different longitudinal axis directions of the rail, an E field coupling element and an H field coupling element are required. The electrical terminals of the E field coupling element and the H field coupling element into which or out of which in each case one electrical signal is fed by the transmission and reception unit are spaced apart with an axial spacing of $n \cdot \lambda/2$, preferably $\lambda/2$, along the longitudinal axis of the rail since the E field and the H field have a phase shift of 90° with respect to one another (n is in this case an integral non-negative factor, including zero).

In general, the transmission frequency or the transmission frequency range and therefore the wavelength or the wavelength range of the electromagnetic wave propagating in the rail-based transmission system should be selected to be high such that the spatial extent of the coupling apparatus which is determined by the spacing of $\lambda/4$ or $\lambda/2$ between the individual coupling elements reaches a compact size.

A rail-based data transmission channel used by a plurality of users is excluded from a direct communication between two transmission and reception units—so-called peer-to-peer communication—since such a data transmission channel cannot be used simultaneously by a plurality of transmission-ready transmission and reception units. Rather, it is necessary to organize access for each individual transmission and reception unit to the common transmission medium. The data transmission in the rail-based data transmission channel should preferably be implemented in accordance with the master-slave principle.

One transmission and reception unit is in the form of a master unit, while the remaining transmission and reception units are each in the form of slave units. The master unit is preferably also in the form of an access point. It has, therefore, a data interface with a further data transmission system, preferably a hard-wired data network, within the building. The data interface is preferably connected to the further data transmission system galvanically or in wired fashion, alternatively also wirelessly. The access point can preferably contain a power supply interface which is required in any case between the master unit or the slave units and a power supply in the building.

The scanning for transmission capacity and the allocation of transmission capacity take place by virtue of the master unit. This takes place using conventional methods which have typically been established in the individual transmission standards such as, for example, IEEE 802.11. The transmission-ready slave units can transmit the data to be transmitted to the receiving transmission and reception unit in individual time slots which are allocated to them by the master unit (so-called Time-Division Multiple Access (TDMA) method). As an alternative to the time-division multiple access method, a frequency-division multiple access method (Frequency-Division Multiple Access (FOMA) method) or a code-division multiple access method (Code-Division Multiple Access (CDMA) method) can also be used. A particular case of a frequency-division multiple access method is the so-called OFDM method (Orthogonal Frequency-Division Multiplexing).

The data transmission preferably takes place from the transmitting slave unit to the master unit and then from the master unit to the receiving slave unit. A multicast mode is also conceivable in which a transmitting slave unit conducts a data communication with a plurality of receiving slave units or with all of the remaining receiving slave units via the master unit.

The determination as to which transmission and reception unit acts as master unit and which transmission and reception units therefore act as slave units can preferably take place once at the beginning of operation. Preferably, the transmission and reception unit which has a power supply interface to the power supply system of the building will act as master unit. It is also conceivable, in analogy to an ad hoc network, for the individual transmission and reception units to determine amongst themselves within a specific, relatively long time frame by means of a specific method which transmission and reception unit acts as master unit and which transmission and reception units therefore act as slave units. The latter variant is particularly suitable in the case of a rail-based data transmission channel with transmission and reception units which change over time.

When the master unit is determined in advance, the transmission and reception unit in the form of master unit preferably needs to be positioned in the geometrical center or in an axial region around the geometrical center along the longitudinal extent of the rail. In this case, the number of transmission and reception units which are positioned spaced apart from the master unit in one longitudinal axis direction of the rail approximately corresponds to the number of transmission and reception units which are positioned spaced apart from the master unit in the other longitudinal axis direction of the rail. Therefore, the data volume to be transmitted is approximately equally high between the master unit and the two groups of slave units, which are each positioned in one longitudinal axis direction or in the other longitudinal axis direction of the rail. Such an arrangement of a master unit is particularly suitable for the beamforming method since it enables best possible utilization of the transmission capacity of the rail-based data transmission channel.

In the case of a relatively large longitudinal extent of the rail-based data transmission system, in a preferred development of the invention the electrical line of the data transmission channel has a plurality of rails, which are connectable to one another at the end side and consist of an electrically insulating material, and associated interconnectable electrical conductors. The dielectric rails in this case touch edge to edge at the ends in order to realize a continuous dielectricity per unit length along the entire electrical line and thereby to avoid or at least minimize an electrical imperfection in the transmission channel.

The axial connection of the individual successive dielectric rails takes place either directly between the two rails to be coupled or by means of an additional connecting element. In the case of direct coupling of the two rails to be connected, the axial ends of the two rails are shaped in such a way that a force-fitting connection, for example by virtue of conically shaped profiles, a form-fitting connection, for example by virtue of latching element pairs, a materially bonded connection, for example by virtue of adhesive bonding, or a screw connection is possible. An indirect connection via an additional connecting means is possible, for example, via a clamping element which is clamped in a force-fitting manner in associated cutouts at the axial ends of the adjacent rails. Two adjacent rails can be connected to one another on the outside via a collar, which is connectable to the two rails either in a force-fitting or in a form-fitting manner or via a screw connection.

The electrical connection of the outer conductor coating of two adjacent dielectric rails can preferably be realized by the collar already mentioned above. The coupling between the metal collar and the outer conductor coating of the two rails to be connected to one another is preferably in each case in the form of a $\lambda/4$ resonator. For this purpose, the longitudinal extent of the metal collar in the adjoining regions of the rails to be connected to one another in each case corresponds to a quarter of the wavelength of the electromagnetic wave propagating in the waveguide. In addition, a dielectric coating is applied to the metal outer conductor coating of the individual rails between the metal collar and the metal outer conductor coating in the region of the $\lambda/4$ overlap. By virtue of a collar shaped as a $\lambda/4$ resonator, the transmission loss in the transition between two adjacent rails can be improved for the transmission of a radiofrequency electromagnetic wave within the predetermined bandwidth. The critical parameter here is the electrical length of the collar.

A connecting element having a number of electrical contact elements which corresponds to the number of inner conductors can preferably be used for the electrical connection of the individual electrical conductors acting as inner conductors. For the positioning of the connecting element within the dielectric rail, in each case a correspondingly shaped cutout is formed at the axial ends of the rails. The cutout is preferably designed in such a way that the connecting element disappears completely in the dielectric region of the rail. The individual contact elements have in each case one contact lug at their axial ends which exerts a sufficient contact pressure on the axial ends of the associated electrical conductors. In addition to such a galvanic connection of the individual inner conductors, as an alternative a resonant, DC-isolated coupling by means of a $\lambda/4$ resonator based on the outer conductor contact-making can also be realized.

The electrical connection between two rails can alternatively also be implemented without a connecting element using contact elements. In this case, the electrical inner conductors protrude at one axial end of the rail beyond the axial end of the rail and are shaped as a contact lug in this region.

In a preferred embodiment of the invention, the electrical line of the rail-based data transmission system can branch into at least two electrical lines.

In this case, the dielectric rail branches into at least two dielectric rails, and the associated electrical conductors branch in each case into at least two electrical conductors. In this way, not only can items of terminal equipment be connected to the data transmission system along the linear longitudinal extent of the rail, but also items of terminal equipment which are arranged so as to be distributed areally can be connected to the data transmission system.

Preferably, the branching can be in the form of a T shape or Y shape. However, other shapes of branching are also conceivable. In respect of a good transmission characteristic for radiofrequency electromagnetic waves, the branching angle between the individual branch arms should in each case not have an acute angle. Preferably, the branching angle should in this case be greater than 45°, particularly preferably greater than 60° and very particularly preferably equal to 90° or greater than 90°.

A plurality of electrical conductors or a plurality of pairs of electrical conductors can be arranged within the dielectric rail in the rail-based data transmission system. Thus, a plurality of independent modes of the electromagnetic wave with in each case different data can be transmitted in the rail-based data transmission system. In order to feed the respectively independent modes of the electromagnetic wave into and out of the rail system, the coupling apparatus has in each case separate coupling elements for each inner conductor or for each inner conductor pair which each exchange separate RF signals with the transmission and reception units in the transmission and reception mode. In order to minimize crosstalk between these individual transmission channels within the dielectric rail, preferably metal shielding plates need to be arranged between the individual electrical conductors or the individual pairs of electrical conductors in the dielectric rail along its longitudinal extent.

In order to minimize reflections at the axial ends of the rail and therefore for reflection-minimized transmission of the radiofrequency electromagnetic wave along the entire longitudinal extent of the rail, in each case preferably one low-reflection terminating resistor is connected between each inner conductor and the outer conductor at both axial ends of the rail. In the ideal case of lack of reflections, a reflection-free impedance, i.e. a matched impedance, is connected between each inner conductor and the outer conductor. The matched impedance corresponds to the single-ended system impedance of the respective inner conductor and is, for example, 50Ω.

If two adjacent electrical conductors are guided within the dielectric rail for the transmission of a differential signal, a matched impedance needs to be connected between these two electrical conductors which corresponds to twice the single-ended system impedance, for example 100Ω. As an alternative, in the case of a pair of electrical conductors for the transmission of a differential signal, a matched impedance can be connected between each electrical conductor and the outer conductor coating of the dielectric rail which corresponds to the single-ended system impedance, for example 50Ω.

The realization of the terminating resistors can take place in each case via a suitably shaped metal connecting element, for example a sleeve or a web. The use of discrete electrical components such as, for example, SMD resistors is likewise possible.

If reflections of the radiofrequency electromagnetic wave are accepted at the axial ends of the rail since a MIMO equalization is implemented in the individual transmission and reception units, alternatively the axial ends of the inner conductors and the outer conductor can be connected in each case via a short-circuit connection or via an unmatched impedance. In the case of a dielectric rail having an outer conductor coating and without inner conductors, the axial end faces of the rail can also be provided with a metal coating. The axial ends of the electrical conductors can, with the acceptance of reflections, alternatively be unconnected, i.e. open, in each case. Also, total reflection can be sought at the axial ends of the electrical conductors, by means of a short circuit or by means of open circuitry, in order not to reduce the signal line of the transmission signal at the terminating resistors of the rail and to avoid unfavorable heating of the rail ends.

Current radio communication standards, such as, for example, Bluetooth or IEEE 802.11 (WIFI), or current line standards, such as, for example DOCSIS (Data Over Cable Services Interface Specification), can be used for the data transmission in the data transmission channel.

The above configurations and developments can be combined with one another as desired, where it is sensible to do so. Further possible configurations, developments and implementations of the invention also include combinations which have not been explicitly mentioned of features of the invention which have been described above or below with respect to the exemplary embodiments. In particular, in this case a person skilled in the art will also add individual aspects as improvements or additions to the respective basic form of the present invention.

SUMMARY

A principal aspect of the present invention data transmission system (1) comprising a data transmission channel (2; $2_1$, $2_2$); and a plurality of transmission and reception units (3); and wherein the data transmission channel (2; $2_1$, $2_2$) is an electrical line, which has a rail (4; $4_1$, $4_2$) that is made of an electrically insulating material and the data transmission channel (2; $2_1$, $2_2$) has at least one electrical conductor (5), and wherein the at least one electrical conductor (5) runs in a longitudinal direction along a longitudinal axis (6) of the rail (4; $4_1$, $4_2$), and wherein a lateral surface of the rail (4; $4_1$, $4_2$) is surrounded by at least one electrical conductor (5) and/or at least two of the electrical conductors (5) are kept apart from one other by the rail (4; $4_1$, $4_2$); and, wherein the plurality of transmission and reception units (3) are arranged along the rail (4; $4_1$, $4_2$), and wherein the plurality of transmission and reception units (3) are each configured to couple an electromagnetic wave into the electrical line, or out of the electrical line; and a coupling apparatus (13) for electromagnetic near-field coupling is arranged between at least one of the plurality of transmission and reception units (3) and the electrical line, and wherein the coupling apparatus (13) has at least two coupling elements (14); and wherein each of the at least two coupling elements (14) has an electrical terminal (15), or the coupling apparatus (13) has at least one coupling element (14) that has at least two electrical terminals (15); and wherein the plurality of transmission and reception units (3) has a unit for MIMO equalization (17) and the plurality of transmission and reception units (3) have a unit for MIMO control (18); and wherein the unit for MIMO equalization (17) and the unit for MIMO control (18) are in each case connected to the electrical terminals (15) of the coupling elements (14).

A further aspect of the present invention is a data transmission system (1) having a data transmission channel (2; $2_1$, $2_2$), and a plurality of transmission and reception units (3), wherein the data transmission channel (2; $2_1$, $2_2$) is an electrical line, which has a rail (4; $4_1$, $4_2$) consisting of an electrically insulating material, and at least one electrical conductor (5), wherein the at least one electrical conductor (5) runs in each case in a longitudinal axis direction along a longitudinal axis (6) of the rail (4; $4_1$, $4_2$), wherein the rail (4; $4_1$, $4_2$) is surrounded on the lateral surface side by one of the electrical conductors (5) and/or the rail (4; $4_1$, $4_2$) spaces apart in each case at least two of the electrical conductors (5) from one another, wherein the plurality of transceiver units (3) is arranged along the rail (4; $4_1$, $4_2$), and wherein the plurality of transceiver units (3) is in each case designed to couple an electromagnetic wave into the electrical line or to couple it out of the electrical line.

A further aspect of the present invention is a data transmission system (1) wherein one of the plurality of transmission and reception units (3) couples the electromagnetic wave in or out, respectively, by means of field coupling or by means of galvanic coupling; and, and the rest of the others of the plurality of transmission and reception units (3) couple the electromagnetic wave in or out, respectively, by means of field coupling.

A further aspect of the present invention is a data transmission system (1) characterized in that one of the plurality of transmission and reception units (3) couples the electromagnetic wave in or out by means of field coupling or by means of galvanic coupling, and the remaining transceiver units (3) couple the electromagnetic wave in or out in each case by means of field coupling.

A further aspect of the present invention is a data transmission system (1) further comprising a recess (9) formed in the rail (4; $4_1$, $4_2$) starting from an outer surface of the rail (4; $4_1$, $4_2$) along a longitudinal extent of the rail (4; $4_1$, $4_2$).

A further aspect of the present invention is a data transmission system (1) characterized in that a cutout (9) is formed in the rail (4; $4_1$, $4_2$) starting from the outer surface of the rail (4; $4_1$, $4_2$) along the longitudinal extent of the rail (4; $4_1$, $4_2$).

A further aspect of the present invention is a data transmission system (1) wherein the coupling apparatus (13) has two coupling elements (14), and each coupling element (14) has an electrical terminal (15); and the two coupling elements (14) are two E-field coupling elements, or are two H-field coupling elements, or are a combination of one E-field coupling element and one H-field coupling element.

A further aspect of the present invention is a data transmission system (1) characterized in that a coupling apparatus (13) is arranged between the transceiver unit (3) and the electrical line for electromagnetic near-field coupling between the transceiver unit (3) and the electrical line.

A further aspect of the present invention is a data transmission system (1) wherein the electrical terminals (15) of the two E-field coupling elements or, the electrical terminals (15) of the two H-field coupling elements are kept apart from one other by an axial distance of $\lambda/4\,(2n+1)$ along the longitudinal extent of the rail (4; $4_1$, $4_2$), wherein $\lambda$ is the wavelength of the electromagnetic wave and n is an integer factor.

A further aspect of the present invention is a data transmission system (1) characterized in that the coupling apparatus (13) has at least two coupling elements (14), each having an electrical terminal (15), and/or at least one coupling element (13), each having two electrical terminals (15).

A further aspect of the present invention is a data transmission system (1) wherein the unit for MIMO control (18) is configured to inject a first electrical signal and a second electrical signal, respectively, into the electrical terminal (15) of the two coupling elements (14), and wherein the first electrical signal injected at a first coupling element (14) is phase-delayed by 90° with respect to the first electrical signal injected at a second coupling element (14); and the second electrical signal injected at the second coupling element (14) is phase-delayed by 90° with respect to the second electrical signal injected at the first coupling element (14).

A further aspect of the present invention is a data transmission system (1) characterized in that the plurality of transmission and reception units (3) has a unit for MIMO equalization and a unit for MIMO driving, which are each connected to the electrical terminals (15) of the coupling elements (14).

A further aspect of the present invention is a data transmission system (1) wherein the coupling apparatus (13) with two electrical terminals (15) is a first electrical conductor of a directional coupler, and wherein the first electrical conductor of the directional coupler is coupled to at least one electrical conductor (5) serving as a second electrical conductor of the directional coupler.

A further aspect of the present invention is a data transmission system (1) characterized in that the coupling apparatus (13) has two coupling elements (14), each having an electrical terminal (15), preferably two E field coupling elements or two H field coupling elements or a combination of an E field coupling element and an H field coupling element.

A further aspect of the present invention is a data transmission system (1) wherein the electrical line has a plurality of rails ($4_1$, $4_2$), and each of the plurality of rails ($4_1$, $4_2$) is made of an electrically insulating material and the plurality of rails ($4_1$, $4_2$) can be connected to one other, end-to-end; and associated electrical conductors (5) which can be connected to one other.

A further aspect of the present invention is a data transmission system (1) characterized in that the electrical terminals (15) of two E field coupling elements or of two H field coupling elements are in each case spaced apart from one another with an axial spacing of $\lambda/4\cdot(2n+1)$ along the longitudinal extent of the rail (4; $4_1$, $4_2$), where $\lambda$ is the wavelength of the electromagnetic wave and n is an integral factor.

A further aspect of the present invention is a data transmission system (1) further comprising: a metallic sleeve (7) that electrically connects two electrical conductors (5); and the metallic sleeve (7) is resonantly coupled to the two electrical conductors (5), on an outer conductor side, of the plurality of rails ($4_1$, $4_2$) which can be connected to one other, end-to-end.

A further aspect of the present invention is a data transmission system (1) characterized in that the unit for MIMO driving is designed to inject in each case a first electrical signal and a second electrical signal into the electrical terminal (15) of the two coupling elements (14), wherein the first electrical signal injected at one coupling element (14) has a phase lag through 90° with respect to the first electrical signal injected at the other coupling element (14), and the second electrical signal injected at the other coupling element (14) has a phase lag through 90° with respect to the second electrical signal injected at the first coupling element (14).

A further aspect of the present invention is a data transmission system (1) wherein on an inner conductor side, two electrical conductors (5) which can be connected to one other are electrically connected to a contact element ($2_1$) by way of a connecting element (20).

A further aspect of the present invention is a data transmission system (1) characterized in that the coupling element (13) having two electrical terminals (15) is a first electrical conductor of a directional coupler, wherein the first electrical conductor of the directional coupler is coupled to the electrical conductor (5) acting as the second electrical conductor of the directional coupler.

A further aspect of the present invention is a data transmission system (1) wherein the electrical line branches into at least two electrical lines; and wherein the rail (4; $4_1$, $4_2$) branches into at least two rails (4; $4_1$, $4_2$); and wherein the associated electrical conductors (5) in each case branch into at least two electrical conductors (5).

A further aspect of the present invention is a data transmission system (1) characterized in that the electrical line has a plurality of rails ($4_1$, $4_2$), which are connectable to one another at the end sides and consist of an electrically insulating material, and associated interconnectable electrical conductors (5).

A further aspect of the present invention is a data transmission system (1) further comprising: a shielding plate (25) that is arranged along the longitudinal extent of the rail (4; $4_1$, $4_2$) between a plurality of electrical conductors (5) or between a plurality of pairs (12) of electrical conductors (5).

A further aspect of the present invention is a data transmission system (1) characterized in that, on the outer conductor side, two interconnectable electrical conductors (5) are electrically connected to one another via a metal collar (7), wherein the metal collar (7) is coupled in each case in resonant fashion to the electrical conductors (5), on the outer conductor side, of the rails ($4_1$, $4_2$) which are connectable to one another at the end sides.

A further aspect of the present invention is a data transmission system (1) characterized in that, on the inner conductor side, two interconnectable electrical conductors (5) are electrically connected to a contact element (21) via a connecting element (20) or are electrically connected to one another by virtue of the fact that an electrical conductor (5) is designed to be axially extended with respect to the rail (4; 4$_1$, 4$_2$).

A further aspect of the present invention is a data transmission system (1) characterized in that the electrical line branches into at least two electrical lines, wherein the rail (4; 4$_1$, 4$_2$) branches into at least two rails (4; 4$_1$, 4$_2$), and the associated electrical conductors (5) branch in each case into at least two electrical conductors (5).

A further aspect of the present invention is a data transmission system (1) characterized in that in each case one shielding plate (25) is arranged along the longitudinal extent of the rail (4; 4$_1$, 4$_2$) between a plurality of electrical conductors (5) or between a plurality of pairs (12) of electrical conductors (5).

A still further aspect of the present invention is a data transmission system (1) wherein the coupling apparatus device (13) has two coupling elements (14), and each of the two coupling elements (14) has an electrical terminal (15); and the two coupling elements (14) are two E-field coupling elements; or the two coupling elements (14) are two H-field coupling elements; or the two coupling elements (14) are a combination of one E-field coupling element and one H-field coupling element.

An even still further aspect of the present invention is a data transmission system (1) wherein two electrical conductors (5) are electrically connected to one other by an electrical conductor (5) that is formed axially extended with respect to the rail (4; 4$_1$, 4$_2$).

These and other aspects of the present invention are more fully set forth and disclosed herein.

BRIEF DESCRIPTIONS OF THE FIGURES

The present invention will be explained in more detail below with reference to the exemplary embodiments specified in the schematic figures of the drawings.

Figure 1:
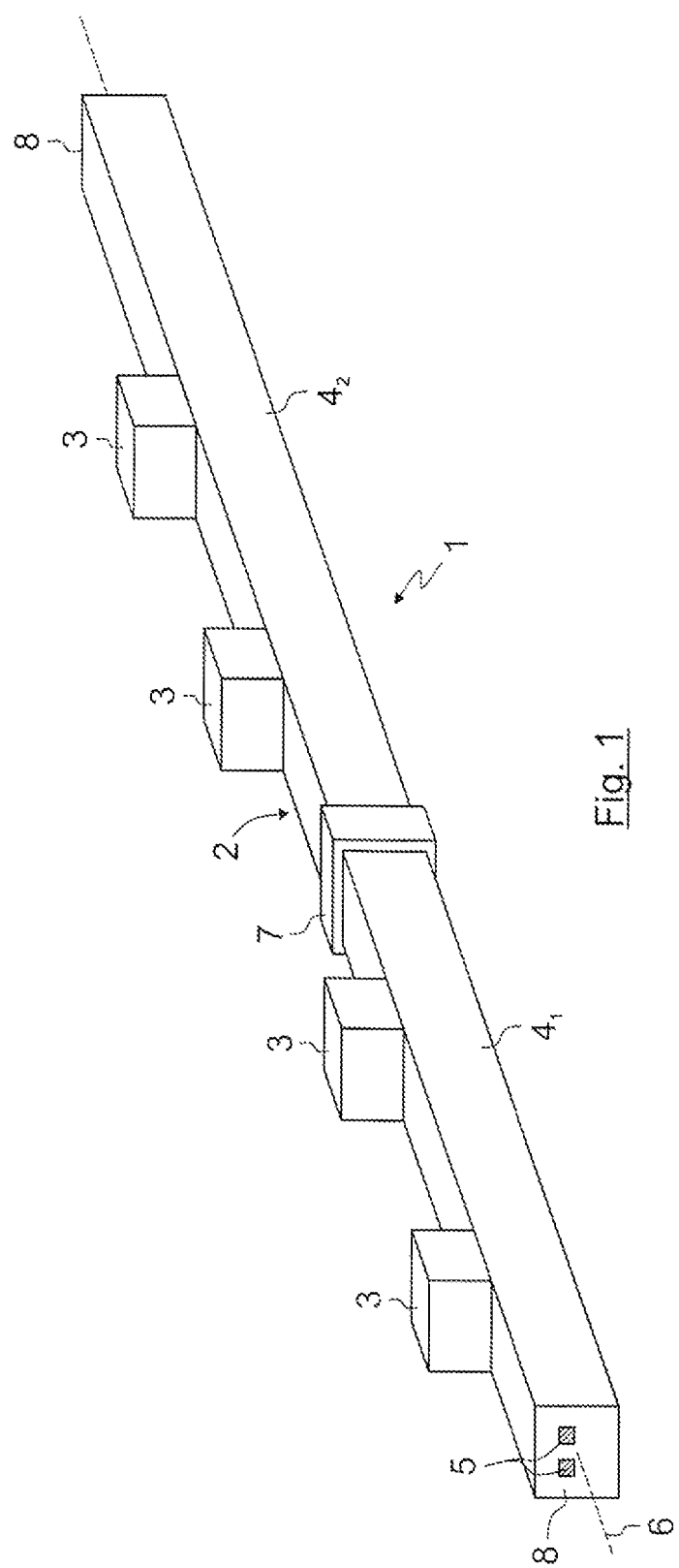
FIG. 1 shows an isometric illustration of a data transmission system according to the invention.

The attached figures in the drawings are intended to impart further understanding of the embodiments of the invention. They illustrate embodiments and serve, alongside the description, to explain principles and concepts of the invention. Other embodiments and many of the mentioned advantages can be gleaned from the drawings. The elements in the drawings are not necessarily depicted true to scale with respect to one another.

In the figures of the drawings, identical, functionally identical and identically acting elements, features and components, if not specified to the contrary, are each provided with the same reference symbols.

The figures will be described in interrelated fashion and comprehensively in the text which follows.

DETAILED DESCRIPTION OF THE PREFERRED EMBODIMENTS

This disclosure of the invention is submitted in furtherance of the Constitutional purposes of the US Patent Laws "to promote the progress of Science and the Useful Arts" (Article 1, Section 8).

In the text which follows, the data transmission system according to the invention will be explained in detail with reference to the individual figures.

The data transmission system 1 shown in FIG. 1 has a data transmission channel 2 and a plurality of transmission and reception units 3, which are arranged along the longitudinal extent of the data transmission channel 2. The data transmission channel 2 is an electrical data transmission channel and consequently contains an electrical line. This electrical line has a dielectric rail 4 and at least one electrical conductor 5, which runs in each case along the longitudinal extent of the dielectric rail 4 and is connected to the dielectric rail 4. The dielectric rail 4 is produced from a rigid dielectric material and has a longitudinal extent along its longitudinal axis 6 which is a multiple of its transverse extent. The rail-based data transmission system 1 can comprise a single rail 4 having associated electrical conductors 5 or a plurality of rails 4 which are electrically and mechanically connected to one another at the end sides and have associated electrical conductors 5. FIG. 1 shows a rail-based data transmission system 1 having two dielectric rails $4_1$ und $4_2$, which are connected to one another at the end sides via a collar 7.

The electrical data transmission channel 2 can have a plurality of embodiments, as illustrated, for example, in FIGS. 2A to 2G.

Figure 2A:
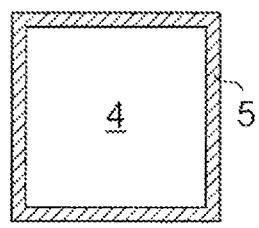
FIG. 2A shows a cross-sectional illustration of a first embodiment of the transmission channel in the data transmission system according to the invention.

A first embodiment of the electrical data transmission channel 2 shown in FIG. 2A comprises only one dielectric rail 4 and a single electrical conductor 5, which is in the form of a metal coating on the lateral surface side of the outer surface of the dielectric rail 4. The metal coating is applied to the entire lateral surface of the dielectric rail 4 with the exception of the regions in which the individual transmission and reception units 3 are arranged on the rail 4. The cross-sectional profile of the rail is preferably square. However, other technically sensible cross-sectional profiles are also conceivable. In such a data transmission channel 2, an electromagnetic wave can propagate within the dielectric rail 4 between the metal coating along the longitudinal axis 6 of the rail 4. The electromagnetic wave which is coupled into the electrical data transmission channel 2 by a transmission and reception unit 3 moves in the simplest case in both longitudinal axis directions of the rail 4. The rail-based data transmission channel 2 has a homogeneous wave impedance over its entire longitudinal extent.

At the axial ends 8 of the rail 4, reflections of the electromagnetic wave can arise if these axial ends 8 of the electrical data transmission channel 2 are not terminated by a matched terminating resistor which corresponds to the wave impedance of the electrical data transmission channel 2. If the axial ends 8 of the electrical data transmission channel 2 are not terminated in matched fashion, in each case reflection of the electromagnetic wave results, and consequently also interferences of the reflected waves between the transmitting transmission and reception unit 3 and the receiving transmission and reception unit 3. The interferences between the individual reflected electromagnetic waves can be considered to be similar to fading and distortion effects as in a mobile multiway transmission channel. By virtue of MIMO equalization, as will be explained more further below, the fading and distortion effects contained in the radiofrequency reception signal which originate from the interferences of the individual reflected electromagnetic waves can be equalized.

Figure 2B:
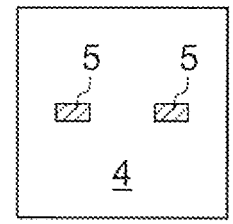
FIG. 2B shows a cross-sectional illustration of a second embodiment of the transmission channel in the data transmission system according to the invention.

In a second embodiment of the electrical data transmission channel 2 shown in FIG. 2B, two electrical conductors 5 are arranged spaced apart from one another within the dielectric rail 4. The two electrical conductors 5 run parallel to the longitudinal axis 6 of the dielectric rail 4. The two electrical conductors 5 have a rectangular cross-sectional profile in FIG. 2B. As an alternative, another profile, for example a round profile, is also possible. An electromagnetic wave can propagate between the two electrical conductors 5 in the differential mode along the longitudinal axis 6 of the rail 4. Therefore, a differential RF signal, i.e. a symmetrical RF signal, can be transmitted in such an electrical data transmission channel 2, which signal corresponds to the radiofrequency electromagnetic wave in the differential mode.

Figure 2C:
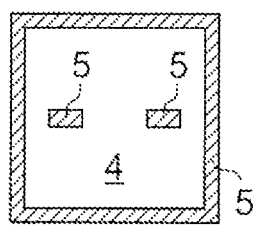
FIG. 2C shows a cross-sectional illustration of a third embodiment of the transmission channel in the data transmission system according to the invention.

The third embodiment of the electrical data transmission channel 2 shown in FIG. 2C has, in addition to the two electrical conductors 5 which are arranged spaced apart from one another within the dielectric rail 4, a further electrical conductor 5, which is in the form of a metal coating on the lateral surface side of the outer surface of the dielectric rail 4. The two electrical conductors 5 arranged within the dielectric rail 4 form the inner conductors, and the metal coating forms the outer conductor of the electrical data transmission channel 2. In the third embodiment of the electrical data transmission channel 2, an RF signal with a higher frequency in comparison with the second embodiment can be transmitted owing to the outer conductor.

Figure 2D:
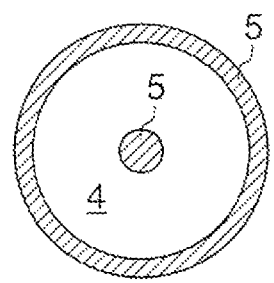
FIG. 2D shows a cross-sectional illustration of a fourth embodiment of the transmission channel in the data transmission system according to the invention.

In a fourth embodiment of the electrical data transmission channel 2 shown in FIG. 2D, a coaxial structure is present. For this purpose, an electrical conductor 5 is arranged in the center of a dielectric rail 4 having a round cross-sectional profile, and a metal coating is applied to the lateral surface of the outer surface of the dielectric rail 4. A radiofrequency electromagnetic wave which corresponds to an asymmetrical RF signal can be transmitted in an electrical data transmission channel 2 having such a design.

Figure 2E:
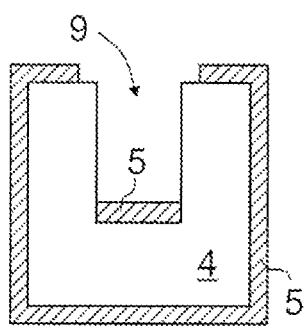
FIG. 2E shows a cross-sectional illustration of a preferred modification of the transmission channel in the data transmission system according to the invention.

In a particular embodiment of an electrical data transmission channel 2 shown in FIG. 2E, the dielectric rail 4 has a cutout 9 over its entire longitudinal extent. This cutout 9 is preferably shaped in the form of a groove with a rectangular cross-sectional profile. However, other basic cross-sectional profiles, for example a triangular basic cross-sectional profile, are also conceivable. An electrical conductor 5, which is fixed to the dielectric rail 4, is arranged on a wall of the cutout 9, preferably on the base of the cutout 9. A metal coating is applied to the dielectric rail 4 on the lateral surface of the outer surface outside the cutout 9. Given suitable dimensioning of the cutout 9, an electrical data transmission channel 2 with a "quasi-coaxial" cross-sectional profile is present, in which a radiofrequency electromagnetic wave can be guided.

Figure 2F:
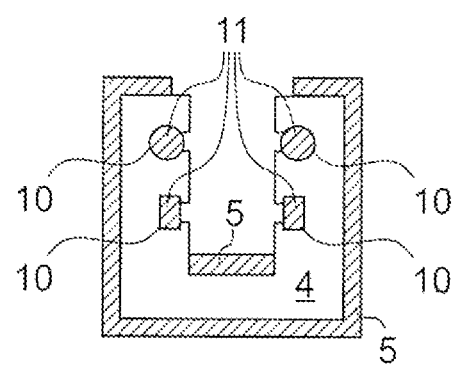
FIG. 2F shows a cross-sectional illustration of a further modification of the transmission channel in the data transmission system according to the invention.

In a development of the preferred embodiment of an electrical data transmission channel 2 shown in FIG. 2F, grooves 10 running in each case in the longitudinal axis direction of the dielectric rail 4 are preferably shaped in the two side walls of the cutout 9, and further electrical conductors 11 are guided in said grooves 10. The grooves 10 each have a cross-sectional profile which corresponds to the cross-sectional profile of the further electrical conductors 11, for example a round or square cross-sectional profile. The further electrical conductors 11 are preferably fixed in the associated grooves 10 in a force-fitting or alternatively form-fitting or materially bonded manner.

These further electrical conductors 11 conduct either a direct current or a single-phase alternating current for the power supply to the individual transmission and reception units or additional electrical components or assemblies, for example luminaires. In a multiple-conductor system, the transmission of three-phase alternating current is also conceivable in applications in which the power consumption is increased. The further electrical conductors 11 can also transmit a drive signal for driving the additional electrical components or assemblies. Power supply conductors having superimposed data signals are also conceivable.

Figure 2G:
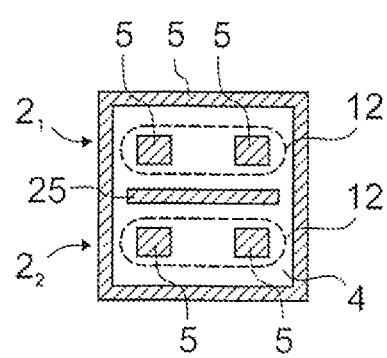
FIG. 2G shows a cross-sectional illustration of a plurality of transmission channels in the data transmission system according to the invention.

Finally, FIG. 2G shows an embodiment of an electrical data transmission channel 2 in which two pairs 12 of two electrical conductors 5 are illustrated within the dielectric rail 4, which conductors 5 transmit in total four modes of an electromagnetic wave, i.e. two differential RF signals each having different data.

In order to eliminate or at least minimize crosstalk between these two electrical data transmission channels $2_1$ und $2_2$, a metal shielding plate 25 is arranged in the dielectric rail 4 between the two pairs 12 of two electrical conductors 5 along the longitudinal extent of the rail 4.

In the text which follows, the coupling of the individual transmission and reception units 3 to the electrical data transmission channel 2 by means of a coupling apparatus 13 is explained with reference to FIGS. 3A to 3E.

In a first variant of a coupling apparatus 13, the technical principle of a directional coupler is used. The coupling apparatus 13 in this case forms one coupling partner of a directional coupler and, for this purpose, has a first electrical conductor of a directional coupler as coupling element 14. The electrical conductor 5, which runs in the interior of the dielectric rail 4, represents the second electrical conductor of the directional coupler. In the case of such a line coupler, the first electrical conductor is coupled electromagnetically to the second electrical conductor.

A coupling apparatus 13 operating in accordance with the directional coupler principle couples an electromagnetic wave into the data transmission channel 2 via an inductive and capacitive coupling with the inner electrical conductor 5. In an equivalent manner, the coupling apparatus 13 couples a partial energy of the electromagnetic wave propagating in the data transmission channel 2 out of the data transmission channel. Owing to the directivity of a directional coupler, a radiofrequency electrical signal which is fed in by the transmission and reception device 3 at an electrical terminal 15 of the coupling apparatus 13 is coupled in as radiofrequency electromagnetic wave, which propagates singly in a longitudinal axis direction of the rail-based data transmission channel 2. The radiofrequency electrical signal fed in at the other electrical terminal 15 of the coupling apparatus 13 is coupled in, owing to the directivity of the directional coupler, as radiofrequency electromagnetic wave, which propagates singly in the other longitudinal axis direction of the rail-based data transmission channel 2.

With the first electrical conductor of the directional coupler, the coupling apparatus 13 operating in accordance with the directional coupler principle has a coupling element 14 having two electrical terminals 15. In order to achieve a high coupling factor, the coupling element 14 of the coupling apparatus 13 is inserted into a cavity formed in the rail 4 through two bushings in the metal outer conductor coating of the dielectric rail 4 and is therefore arranged as close as possible and as parallel as possible to the electrical conductor 5 of the data transmission channel 2.

The coupling apparatus 13 furthermore has an outer conductor coupling 16, which electrically connects the metal coating on the dielectric rail 4 to a reference potential, preferably the ground potential, of the respective transmission and reception unit 3. In respect of a good shielding effect, the outer conductor coupling 16 in a preferred embodiment has two metal sleeves, which each envelop one of the two end sections of the coupling element 14 with the electrical terminal 15 in the region between the outer conductor coating of the dielectric rail 4 and the housing of the transmission and reception unit 3.

The two electrical terminals 15 of the coupling element 14 are electrically connected to the functional units via the radiofrequency electronics (not illustrated) for baseband signal processing of the associated transmission and reception unit 3. The two coupling elements 14 of the coupling apparatus 13 form a "multiple antenna arrangement", with in each case one RF signal to be transmitted or one received RF signal being present at the electrical terminals 15 thereof. The baseband signals belonging in each case to the plurality of RF signals are either generated (transmission mode) or further-processed (reception mode) in the MIMO baseband signal processing. In the reception mode, the received signals are equalized in a unit for MIMO equalization 17 which is part of the baseband signal processing in the transmission and reception unit 3. In the transmission mode, the two signals to be transmitted are generated in a unit for MIMO driving 18, which is likewise part of the baseband signal processing in the transmission and reception unit 3. The separation of the transmission and reception signals can take place depending on the radio transmission standard used, for example using time-division or frequency-division multiplexing.

With a coupling apparatus 13 in accordance with the directional coupler principle, it is possible to feed two RF signals each having different data into the two coupling elements 14 and therefore to couple, in each case separately and simultaneously, two electromagnetic waves each having different data into the two longitudinal axis directions of the rail 4. At the same time, it is possible using such a coupling apparatus 13 to couple out two electromagnetic waves propagating in each case in different longitudinal axis directions of the rail 4 separately. Therefore, beamforming is possible using such a coupling apparatus.

Figure 3A:
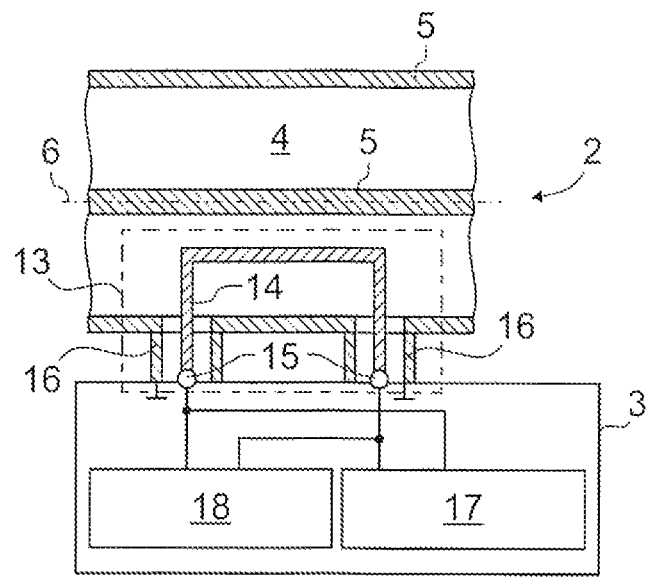
FIG. 3A shows an illustration of a coupling apparatus in accordance with the directional coupler principle and an associated transmission and reception unit.
Figure 3B:
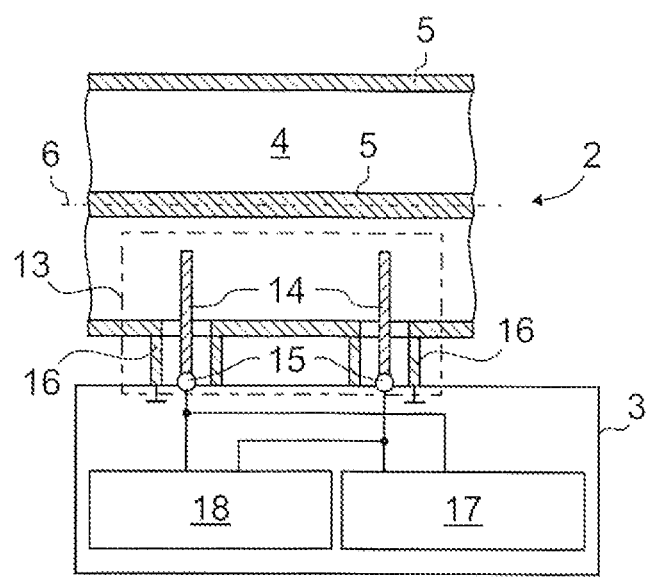
FIG. 3B shows an illustration of a coupling apparatus having two E field coupling elements and an associated transmission and reception unit.

In a second variant of a coupling apparatus 13 shown in FIG. 3B, two E field coupling elements which are each in the form of small monopole antennas or alternatively of dipole antennas are used as coupling elements 14. Such E field coupling elements can each couple an electromagnetic wave into the data transmission channel 2 or out of the data transmission channel 2 by means of a capacitive coupling.

With such a coupling apparatus 13, it is also possible for two electromagnetic waves to be coupled into the rail-based data transmission channel 2. In the unit for MIMO equalization 17, the two electrical signals transmitted in each case by another transmission and reception unit 3 can be reconstructed using a MIMO equalization method from the two electromagnetic waves which are coupled out of the rail-based data transmission channel 2 via the two E field coupling elements and are supplied to the unit for MIMO equalization 17 via the two electrical terminals 15 as electrical signals.

In order to additionally optimize the equalization and reconstruction of the transmitted electrical signals in the unit for MIMO equalization 17, the coupling apparatus 13 having two E field coupling elements couples in two electromagnetic waves each having different data which in each case propagate in a single direction which is different from one another in the data transmission channel. In this way, beamforming of the two coupled-in electromagnetic waves in in each case one of the two longitudinal axis directions of the rail-based data transmission system 1 is realized.

For this purpose, the two E field coupling elements are spaced apart from one another in each case with an axial spacing of $\lambda/4 \cdot (2n+1)$, preferably $\lambda/4$, along the longitudinal axis 6 of the rail 4. In this case, $\lambda$ is the wavelength of the electromagnetic wave and n is a non-negative integral factor.

In addition, the unit for MIMO driving 18 is, for this purpose, designed to inject in each case a first electrical signal and a second electrical signal into the electrical terminals 15 of the two E field coupling elements. The first electrical signal which is injected at one E field coupling element has a phase lag through 90° with respect to the first electrical signal injected at the other E field coupling element, and the second electrical signal injected at the other E field coupling element has a phase lag through 90° with respect to the second electrical signal injected at the first E field coupling element.

Owing to the fact that the first electrical signal is fed in at one E field coupling element with a 90° phase shift with respect to the other E field coupling element and the axial spacing between the one E field coupling element and the other E field coupling element preferably corresponds to λ/4, the electromagnetic waves belonging in each case to the first electrical signals are superimposed on one another destructively at the one E field coupling element and constructively at the other E field coupling element. Therefore, an electromagnetic wave propagates from the infeed of the two first electrical signals singly in one longitudinal axis direction along the longitudinal axis 6 of the data transmission channel 2 from one E field coupling element to the other E field coupling element.

The infeed of the second electrical signals at the two E field coupling elements is the opposite of the infeed of the two first electrical signals. Therefore, the electromagnetic waves belonging in each case to the second electrical signals are superimposed on one another constructively at the one E field coupling element and destructively at the other E field coupling element. Therefore, an electromagnetic wave propagates from the infeed of the two second electrical signals singly in one longitudinal axis direction along the longitudinal axis 6 of the data transmission channel 2 from the other E field coupling element to the first E field coupling element.

Since the two electromagnetic waves each having different data are radiated out by the coupling apparatus 13 in each case only in a single longitudinal axis direction, which is in each case different from one another, of the data transmission channel 2, the interferences of the electromagnetic waves reflected at the axial ends 8 of the data transmission channel 2 are reduced. Therefore, the degree of distortion of the two electrical signals fed out in each case at the electrical terminals 15 of the coupling apparatus 13 is reduced. The two transmitted electrical signals can therefore be reconstructed better in the unit for MIMO equalization 17.

Figure 3C:
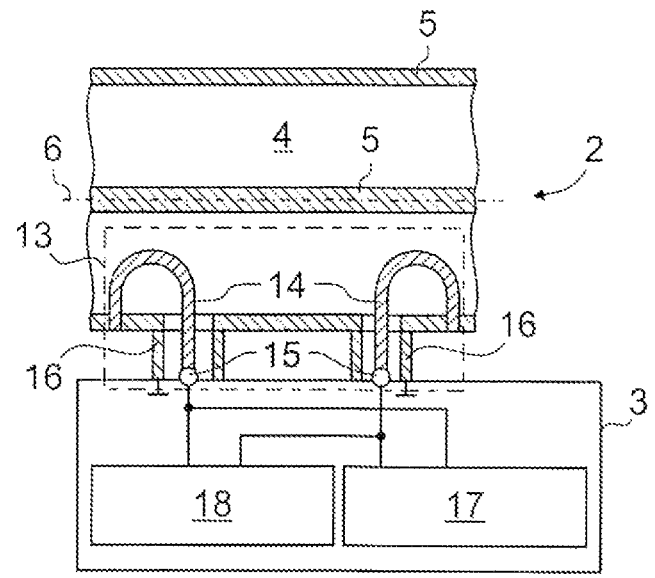
FIG. 3C shows an illustration of a coupling apparatus having two H field coupling elements and an associated transmission and reception unit.

In a third variant of a coupling apparatus 13 shown in FIG. 3C, two H field coupling elements which are each in the form of small loop antennas are used as coupling elements 14. Such an H field coupling element can couple an electromagnetic wave into the data transmission channel 2 or out of the data transmission channel 2 by means of inductive coupling. The H field coupling element is connected to the transmission and reception unit 3 via a single electrical terminal 15. The other electrical terminal of the H field coupling element is electrically connected to the outer conductor coating of the dielectric rail 4 and therefore to the ground potential of the transmission and reception unit 3 via the outer conductor coating 16. The axial extent of the H field coupling element should preferably be selected to be less than λ/4.

By virtue of two RF signals being fed in and out at the electrical terminals 15 of the two H field coupling elements, in an equivalent manner to two E field coupling elements, two electromagnetic waves can be coupled into the data transmission channel 2 and out of the data transmission channel 2. The signal processing in the unit for MIMO driving 18 and in the unit for MIMO equalization 17 is identical to that in the case of a coupling apparatus 13 having two E field coupling elements.

For the beamforming, likewise two H field coupling elements are required. The two electrical terminals 15 of each H field coupling element which are connected in each case to the unit for MIMO driving 18 and the unit for MIMO equalization 17 likewise need to be spaced apart from one another with an axial spacing of λ/4·(2n+1), preferably λ/4, along the longitudinal axis 6 of the rail 4.

The injection of a first electrical signal and a second electrical signal into the electrical terminals 15 of the two H field coupling elements during beamforming takes place in identical fashion to in the case of beamforming in the case of a coupling apparatus having two E field coupling elements.

Figure 3D:
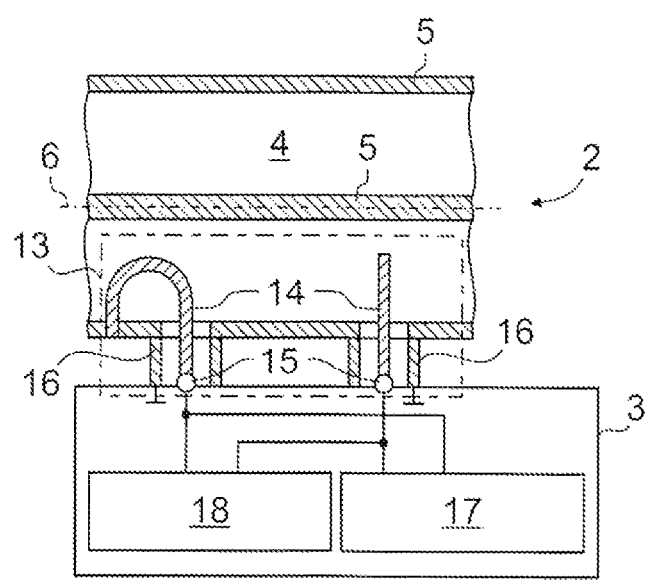
FIG. 3D shows an illustration of a coupling apparatus having one E field coupling element and one H field coupling element and an associated transmission and reception unit.

Finally, FIG. 3D shows a coupling apparatus having one E field coupling element and one H field coupling element.

For the beamforming, the electrical terminals 15 of the E field coupling element and the H field coupling element, which are each electrically connected to the unit for MIMO driving 18 and to the unit for MIMO equalization 17, should be spaced apart from one another with an axial spacing of λ/2·n, preferably λ/2, along the longitudinal axis 6 of the rail 4. In this case, λ is the wavelength of the electromagnetic wave, and n is a non-negative integral number, including zero. This means that the E coupling element and the H coupling element may be located at an identical point.

Figure 3E:
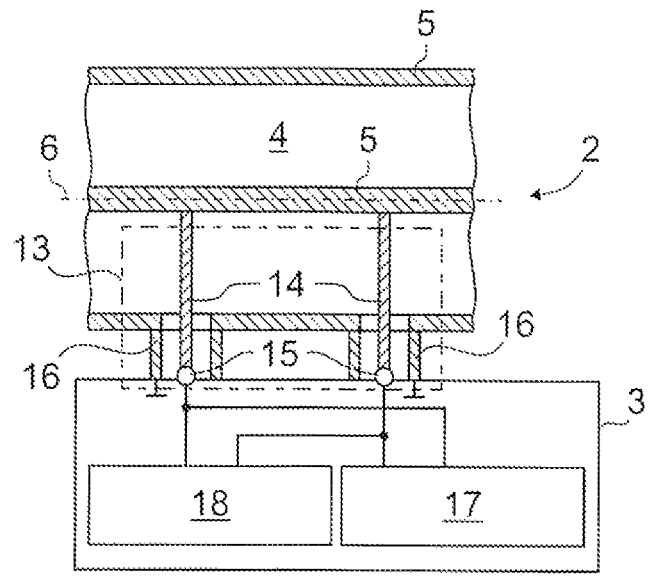
FIG. 3E shows an illustration of a coupling apparatus having galvanic coupling elements and an associated transmission and reception unit.

Finally, FIG. 3E shows a coupling apparatus 13 having galvanic coupling. The two coupling elements 14 have, for this purpose, in each case one electrical terminal 15 for feeding in or out a radiofrequency electrical signal from or to the transmission and reception unit. The galvanic coupling of the two coupling elements 14 to the electrical line of the rail-based data transmission system 1 takes place by electrical and mechanical connection of those ends of the two coupling elements 14 which are in each case opposite the electrical terminals 15 to the electrical conductor 5 of the rail 4. The electrical and mechanical connections between the two coupling elements 14 and the electrical conductor 5 are spaced apart from one another with an axial spacing of λ/4·(2n+1), preferably λ/4, along the longitudinal axis 6 of the rail (n is in this case a non-negative, natural number). Such a galvanic coupling can be realized only for a transmission and reception unit 3 which is in the form of an access point of the rail-based data transmission system 1.

Figure 4A:
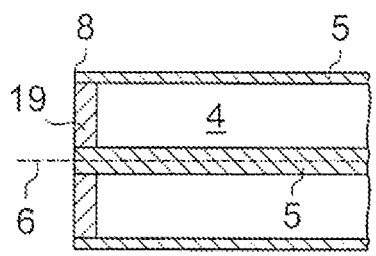
FIG. 4A shows a longitudinal sectional illustration with terminating impedance in the case of an asymmetrical transmission channel.

In the text which follows, the configuration of the axial ends 8 of the dielectric rail 4 is explained with reference to FIGS. 4A, 48 and 4C.

The axial ends 8 of the data transmission channel 2 can be terminated by a suitably selected terminating resistor 19 in order to minimize a reflection of the electromagnetic wave. In the case of an asymmetric data transmission channel 2 shown in FIG. 4A, this is an electrically conductive connecting element, for example a sleeve, which is arranged at the axial end 8 between the two electrical conductors 5, namely the inner conductor and the outer conductor. This electrically conductive connecting element is dimensioned in such a way and produced from such an electrically conductive material that the terminating resistor 19 corresponds to the wave impedance of the data transmission channel 2, for example 50Ω.

Figure 4B:
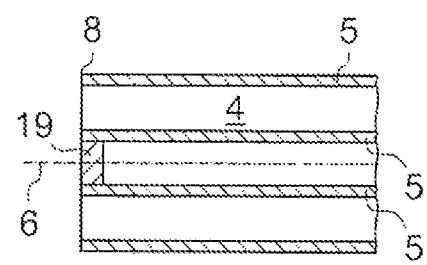
FIG. 4B shows a longitudinal sectional illustration with terminating impedance in the case of a symmetrical transmission channel in the differential mode.

In the case of a symmetrical data transmission channel, an electrically conductive connecting element, for example a beam, is arranged at the axial end 8 of the data transmission channel 2 between the two electrical conductors 5, namely the two inner conductors, for the differential mode, as shown in FIG. 4B. This electrically conductive connecting element is dimensioned in such a way and produced from such an electrically conductive material that the terminating resistor 19 corresponds to twice the single-ended impedance of the data transmission channel 2, for example 100Ω.

Figure 4C:
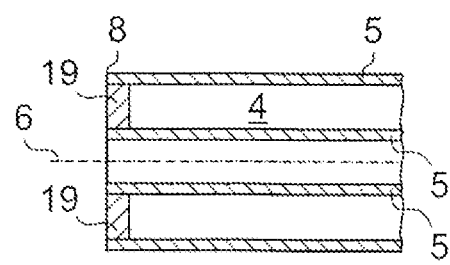
FIG. 4C shows a longitudinal sectional illustration with terminating impedance in the case of a symmetrical transmission channel in the common mode.

In the case of a symmetrical data transmission channel, in each case one electrically conductive connecting element is arranged at the axial end 8 of the data transmission channel 2 between one of the two inner conductors and the outer conductor coating for the common mode, as shown in FIG. 4C. Each of these electrically conductive connecting elements is in each case dimensioned in such a way and produced from such an electrically conductive material that the terminating resistor 19 corresponds to the single-ended impedance of the data transmission channel 2, for example 50Ω.

If a data signal is additionally transmitted over two power supply conductors, the two power supply conductors are in each case open, i.e. unconnected, at the axial end 8 of the data transmission channel 2 in a first variant. In a second variant, the two power supply conductors are connected to one another at the axial end 8 via a capacitor having a high capacitance. In a third variant, the axial ends 8 of the power supply conductors are connected to one another via a series circuit comprising a capacitor having a high capacitance and a terminating resistor.

In addition to a matched termination of the axial ends 8 of the data transmission channel 2, alternatively an unmatched termination using an unmatched terminating resistor is also conceivable. In this case, the signal power of the electromagnetic wave is not converted completely into disruptive heat at the axial ends 8 of the data transmission channel 2, but rather some of the signal energy is reflected at the axial ends 8. In the case of a total reflection in the case of unconnected axial ends, i.e. open axial ends, of the individual electrical conductors 5 or a short circuit connection between the individual electrical conductors 5, there is no disruptive conversion of the signal power into heat. For the case of partial and total reflection, interferences of the individual reflected electromagnetic waves arise. These interferences of the individual reflected electromagnetic waves result in fading and distortion effects of the reception signal in the transmission and reception unit 3. For the reconstruction of the originally transmitted electrical signals from the received electrical signals, the above-explained unit for MIMO equalization 17 is used.

MIMO systems can in principle manage very well with multiple reflections; no-load operation at the ends of the rail therefore does not represent a problem as regards signal transmission. When the terminations are dispensed with, even a better signal-to-noise ratio is expected since no proportion of the energy contained in the useful signal is dissipated in the terminations.

In the text which follows, the electrical connection between electrical conductors 5 in a rail-based data transmission channel 2 between two rails 4 which are connected to one another at the ends is explained with reference to FIGS. 5A to 5C.

Figure 5A:
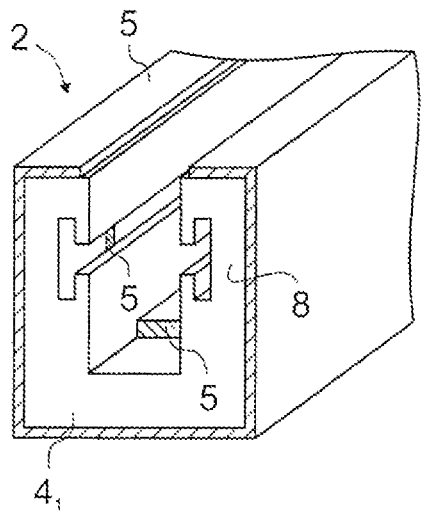
FIG. 5A shows an isometric illustration of a rail which can be connected at the end side in the unconnected state.
Figure 5B:
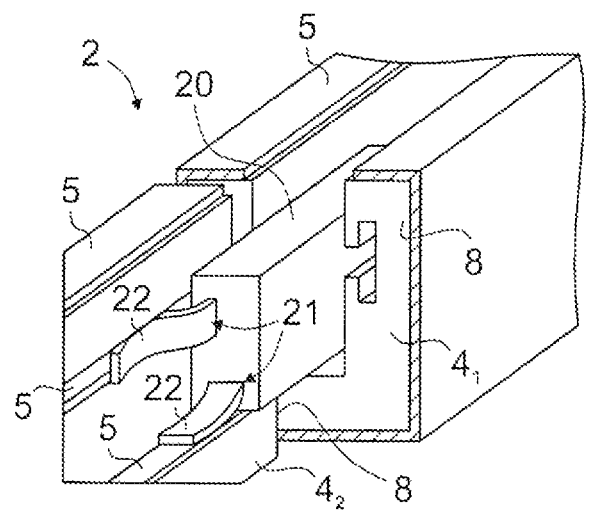
FIG. 5B shows an isometric illustration of two rails connected to one another at the end sides.
Figure 5C:
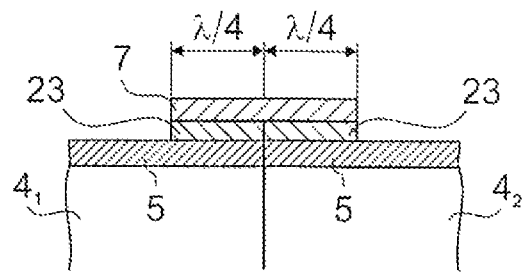
FIG. 5C shows a detail of a longitudinal sectional illustration of an outer conductor connection in the case of two rails connected to one another at the end sides.

The isometric illustration in FIG. 5A shows the axial end 8 of one embodiment of an electrical data transmission channel 2 shown in FIG. 2F. All of the electrical conductors 5 which are arranged within the dielectric rail 4 are not guided up to the end-side end of the dielectric rail 4. As a result of the fact that the inner conductors of the data transmission channel 2 are shortened in such a way at their axial end, a dielectric connecting element 20 can be inserted, as shown in FIG. 5B, into the two rails 4 which are to be connected to one another at the ends in the region of the axial ends 8 of the rails 4.

The connecting element 20 contains in each case one electrically conductive contact element 21 for each pair of electrical conductors 5 to be connected to one another. At the two axial ends of the individual contact elements 21 there are formed in each case contact lugs 22, which, in the plugged state of the two rails 4, exert a sufficient contact pressure on the respective electrical conductor 5. The connecting element 20 is also used for mechanically fixing the two rails 4 to be connected to one another at the ends. For this purpose, preferably side walls of the connecting element 20 are shaped conically in order to realize a force-fitting connection with the adjacent rails 4 by means of a press fit. As an alternative, a materially bonded connection by means of adhesive bonding or a form-fitting connection by means of shaping of latching elements is also possible.

As an alternative, an electrical and mechanical connection of two rails 4 to be connected to one another at the ends without a connecting element 20 is also possible. For this purpose, the inner conductors are extended at an axial end with respect to the axial end of the dielectric rail 4 and to form with comprise a contact lug. For the mechanical fixing, an end-side extension needs to be formed with a cone or bevel at one axial end of the dielectric rail 4, which cone or bevel is inserted into a corresponding cutout at the axial end of the further rail 3 in a force-fitting manner.

For the electrical connection of the metal outer conductor coating on two dielectric rails 4 to be connected in each case, the electrically very conductive collar 7 which has already been mentioned above is used, as shown in FIG. 5C. The electrical function of the collar 7 can be described as a series circuit of two quarter-wave resonators tuned to the operating frequency which transform the electrical no-load operation at the ends of the collar into a short circuit at the abutting surface between the rail segments.

For this purpose, the collar 7 is designed to be metal and has an electrical length of the order of half the wavelength of the electromagnetic wave in the rail-based data transmission channel 2. The metal collar 7 in this case overlaps in each case with half its axial extent, i.e. with an electrical length of a quarter of the wavelength, each outer conductor coating of the two adjacent rails 4. In order to realize the resonant coupling between the metal collar 7 and the outer conductor coating, a dielectric layer 23 is preferably applied in the region of the resonant coupling on the outer conductor coating.

Figure 6:
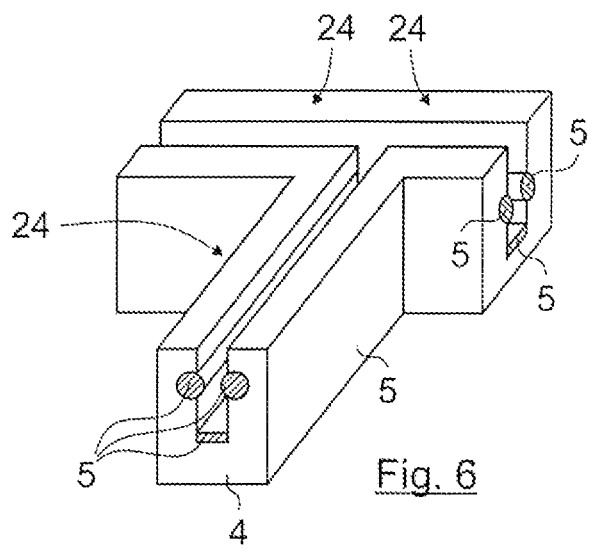
FIG. 6 shows an isometric illustration of a branching in a rail-based data transmission system.

In addition to the extension of a rail-based data transmission channel 2 by connecting a plurality of rails 4 at the end side, branching in a rail-based data transmission channel 2 is also possible. FIG. 6 shows a T-shaped branching of a rail-based data transmission channel 2 with in total three branch arms 24. Other embodiments of branching, for example a Y-shaped branching, are likewise conceivable. The branching angle between the individual branch arms 24 should not be configured to be too small, in particular not acute-angled, in order to minimize reflections in the region of the branching.

Although the present invention has been described completely above with reference to preferred exemplary embodiments, it is not restricted thereto but can be modified in a variety of ways.

OPERATION

Having described the structure of our Plug Connector Assembly and Battery Assembly, its operation is briefly described.

A principal object of the present invention data transmission system (1) comprising a data transmission channel (2; $2_1$, $2_2$); and a plurality of transmission and reception units (3); and wherein the data transmission channel (2; $2_1$, $2_2$) is an electrical line, which has a rail (4; $4_1$, $4_2$) that is made of an electrically insulating material and the data transmission channel (2; $2_1$, $2_2$) has at least one electrical conductor (5), and wherein the at least one electrical conductor (5) runs in a longitudinal direction along a longitudinal axis (6) of the rail (4; $4_1$, $4_2$), and wherein a lateral surface of the rail (4; $4_1$, $4_2$) is surrounded by at least one electrical conductor (5) and/or at least two of the electrical conductors (5) are kept apart from one other by the rail (4; $4_1$, $4_2$); and, wherein the plurality of transmission and reception units (3) are arranged along the rail (4; $4_1$, $4_2$), and wherein the plurality of transmission and reception units (3) are each configured to couple an electromagnetic wave into the electrical line or out of the electrical line; and a coupling apparatus (13) for electromagnetic near-field coupling is arranged between at least one of the plurality of transmission and reception units (3) and the electrical line, and wherein the coupling apparatus (13) has at least two coupling elements (14); and wherein each of the at least two coupling elements (14) has an electrical terminal (15), or the coupling apparatus (13) has at least one coupling element (14) that has at least two electrical terminals (15); and wherein the plurality of transmission and reception units (3) has a unit for MIMO equalization (17) and the plurality of transmission and reception units (3) have a unit for MIMO control (18); and wherein the unit for MIMO equalization (17) and the unit for MIMO control (18) are in each case connected to the electrical terminals (15) of the coupling elements (14).

A further object of the present invention is a data transmission system (1) having a data transmission channel (2; $2_1$, $2_2$), and a plurality of transmission and reception units (3), wherein the data transmission channel (2; $2_1$, $2_2$) is an electrical line, which has a rail (4; $4_1$, $4_2$) consisting of an electrically insulating material, and at least one electrical conductor (5), wherein the at least one electrical conductor (5) runs in each case in a longitudinal axis direction along a longitudinal axis (6) of the rail (4; $4_1$, $4_2$), wherein the rail (4; $4_1$, $4_2$) is surrounded on the lateral surface side by one of the electrical conductors (5) and/or the rail (4; $4_1$, $4_2$) spaces apart in each case at least two of the electrical conductors (5) from one another, wherein the plurality of transceiver units (3) is arranged along the rail (4; $4_1$, $4_2$), and wherein the plurality of transceiver units (3) is in each case designed to couple an electromagnetic wave into the electrical line or to couple it out of the electrical line.

A further object of the present invention is a data transmission system (1) wherein one of the plurality of transmission and reception units (3) couples the electromagnetic wave in or out, respectively, by means of field coupling or by means of galvanic coupling; and, and the rest of the others of the plurality of transmission and reception units (3) couple the electromagnetic wave in or out, respectively, by means of field coupling.

A further object of the present invention is a data transmission system (1) characterized in that one of the plurality of transmission and reception units (3) couples the electromagnetic wave in or out by means of field coupling or by means of galvanic coupling, and the remaining transceiver units (3) couple the electromagnetic wave in or out in each case by means of field coupling.

A further object of the present invention is a data transmission system (1) further comprising a recess (9) formed in the rail (4; $4_1$, $4_2$) starting from an outer surface of the rail (4; $4_1$, $4_2$) along a longitudinal extent of the rail (4; $4_1$, $4_2$).

A further object of the present invention is a data transmission system (1) characterized in that a cutout (9) is formed in the rail (4; $4_1$, $4_2$) starting from the outer surface of the rail (4; $4_1$, $4_2$) along the longitudinal extent of the rail (4; $4_1$, $4_2$).

A further object of the present invention is a data transmission system (1) wherein the coupling apparatus (13) has two coupling elements (14), and each coupling element (14) has an electrical terminal (15); and the two coupling elements (14) are two E-field coupling elements, or are two H-field coupling elements, or are a combination of one E-field coupling element and one H-field coupling element.

A further object of the present invention is a data transmission system (1) characterized in that a coupling apparatus (13) is arranged between the transceiver unit (3) and the electrical line for electromagnetic near-field coupling between the transceiver unit (3) and the electrical line.

A further object of the present invention is a data transmission system (1) wherein the electrical terminals (15) of the two E-field coupling elements or, the electrical terminals (15) of the two H-field coupling elements are kept apart from one other by an axial distance of $\lambda/4$ (2n+1) along the longitudinal extent of the rail (4; $4_1$, $4_2$), wherein $\lambda$ is the wavelength of the electromagnetic wave and n is an integer factor.

A further object of the present invention is a data transmission system (1) characterized in that the coupling apparatus (13) has at least two coupling elements (14), each having an electrical terminal (15), and/or at least one coupling element (13), each having two electrical terminals (15).

A further object of the present invention is a data transmission system (1) wherein the unit for MIMO control (18) is configured to inject a first electrical signal and a second electrical signal, respectively, into the electrical terminal (15) of the two coupling elements (14), and wherein the first electrical signal injected at a first coupling element (14) is phase-delayed by 90° with respect to the first electrical signal injected at a second coupling element (14); and the second electrical signal injected at the second coupling element (14) is phase-delayed by 90° with respect to the second electrical signal injected at the first coupling element (14).

A further object of the present invention is a data transmission system (1) characterized in that the plurality of transmission and reception units (3) has a unit for MIMO equalization and a unit for MIMO driving, which are each connected to the electrical terminals (15) of the coupling elements (14).

A further object of the present invention is a data transmission system (1) wherein the coupling apparatus (13) with two electrical terminals (15) is a first electrical conductor of a directional coupler, and wherein the first electrical conductor of the directional coupler is coupled to at least one electrical conductor (5) serving as a second electrical conductor of the directional coupler.

A further object of the present invention is a data transmission system (1) characterized in that the coupling apparatus (13) has two coupling elements (14), each having an electrical terminal (15), preferably two E field coupling elements or two H field coupling elements or a combination of an E field coupling element and an H field coupling element.

A further object of the present invention is a data transmission system (1) wherein the electrical line has a plurality of rails ($4_1$, $4_2$), and each of the plurality of rails ($4_1$, $4_2$) is made of an electrically insulating material and the plurality of rails ($4_1$, $4_2$) can be connected to one other, end-to-end; and associated electrical conductors (5) which can be connected to one other.

A further object of the present invention is a data transmission system (1) characterized in that the electrical terminals (15) of two E field coupling elements or of two H field coupling elements are in each case spaced apart from one another with an axial spacing of $\lambda/4\cdot(2n+1)$ along the longitudinal extent of the rail (4; $4_1$, $4_2$), where $\lambda$ is the wavelength of the electromagnetic wave and n is an integral factor.

A further object of the present invention is a data transmission system (1) further comprising: a metallic sleeve (7) that electrically connects two electrical conductors (5); and the metallic sleeve (7) is resonantly coupled to the two electrical conductors (S), on an outer conductor side, of the plurality of rails ($4_1$, $4_2$) which can be connected to one other, end-to-end.

A further object of the present invention is a data transmission system (1) characterized in that the unit for MIMO driving is designed to inject in each case a first electrical signal and a second electrical signal into the electrical terminal (15) of the two coupling elements (14), wherein the first electrical signal injected at one coupling element (14) has a phase lag through 90° with respect to the first electrical signal injected at the other coupling element (14), and the second electrical signal injected at the other coupling element (14) has a phase lag through 90° with respect to the second electrical signal injected at the first coupling element (14).

A further object of the present invention is a data transmission system (1) wherein on an inner conductor side, two electrical conductors (5) which can be connected to one other are electrically connected to a contact element ($2_1$) by way of a connecting element (20).

A further object of the present invention is a data transmission system (1) characterized in that the coupling element (13) having two electrical terminals (15) is a first electrical conductor of a directional coupler, wherein the first electrical conductor of the directional coupler is coupled to the electrical conductor (5) acting as the second electrical conductor of the directional coupler.

A further object of the present invention is a data transmission system (1) wherein the electrical line branches into at least two electrical lines; and wherein the rail (4; $4_1$, $4_2$) branches into at least two rails (4; $4_1$, $4_2$); and wherein the associated electrical conductors (5) in each case branch into at least two electrical conductors (5).

A further object of the present invention is a data transmission system (1) characterized in that the electrical line has a plurality of rails ($4_1$, $4_2$), which are connectable to one another at the end sides and consist of an electrically insulating material, and associated interconnectable electrical conductors (5).

A further object of the present invention is a data transmission system (1) further comprising: a shielding plate (25) that is arranged along the longitudinal extent of the rail (4; $4_1$, $4_2$) between a plurality of electrical conductors (5) or between a plurality of pairs (12) of electrical conductors (5).

A further object of the present invention is a data transmission system (1) characterized in that, on the outer conductor side, two interconnectable electrical conductors (5) are electrically connected to one another via a metal collar (7), wherein the metal collar (7) is coupled in each case in resonant fashion to the electrical conductors (5), on the outer conductor side of the rails ($4_1$, $4_2$) which are connectable to one another at the end sides.

A further object of the present invention is a data transmission system (1) characterized in that, on the inner conductor side, two interconnectable electrical conductors (5) are electrically connected to a contact element (21) via a connecting element (20) or are electrically connected to one another by virtue of the fact that an electrical conductor (5) is designed to be axially extended with respect to the rail (4; $4_1$, $4_2$).

A further object of the present invention is a data transmission system (1) characterized in that the electrical line branches into at least two electrical lines, wherein the rail (4; $4_1$, $4_2$) branches into at least two rails (4; $4_1$, $4_2$), and the associated electrical conductors (5) branch in each case into at least two electrical conductors (5).

A further object of the present invention is a data transmission system (1) characterized in that in each case one shielding plate (25) is arranged along the longitudinal extent of the rail (4; $4_1$, $4_2$) between a plurality of electrical conductors (5) or between a plurality of pairs (12) of electrical conductors (5).

A still further object of the present invention is a data transmission system (1) wherein the coupling apparatus device (13) has two coupling elements (14), and each of the two coupling elements (14) has an electrical terminal (15); and the two coupling elements (14) are two E-field coupling elements; or the two coupling elements (14) are two H-field coupling elements; or the two coupling elements (14) are a combination of one E-field coupling element and one H-field coupling element.

An even still further object of the present invention is a data transmission system (1) wherein two electrical conductors (5) are electrically connected to one other by an electrical conductor (5) that is formed axially extended with respect to the rail (4; $4_1$, $4_2$).

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. A data transmission system (1) comprising:
   a data transmission channel (2; $2_1$, $2_2$); and
   a plurality of transmission and reception units (3); and wherein
   the data transmission channel (2; $2_1$, $2_2$) is an electrical line, which has a rail (4; $4_1$, $4_2$) that is made of an electrically insulating material and the data transmission channel (2; $2_1$, $2_2$) has at least one electrical conductor (5), and wherein the at least one electrical conductor (5) runs in a longitudinal direction along a longitudinal axis (6) of the rail (4; $4_1$, $4_2$), and wherein a lateral surface of the rail (4; $4_1$, $4_2$) is surrounded by at least one electrical conductor (5) and/or at least two of the electrical conductors (5) are kept apart from one other by the rail (4; $4_1$, $4_2$); and, wherein
   the plurality of transmission and reception units (3) are arranged along the rail (4; $4_1$, $4_2$), and wherein the plurality of transmission and reception units (3) are each configured to couple an electromagnetic wave into the electrical line or out of the electrical line; and a coupling apparatus (13) for electromagnetic near-field coupling is arranged between at least one of the plurality of transmission and reception units (3) and the electrical line, and wherein the coupling apparatus (13) has at least two coupling elements (14); and wherein each of the at least two coupling elements (14) has an electrical terminal (15), or the coupling apparatus (13) has at least one coupling element (14) that has at least two electrical terminals (15); and wherein the plurality of transmission and reception units (3) has a unit for MIMO equalization (17) and the plurality of transmission and reception units (3) has a unit for MIMO control (18); and wherein the unit for MIMO equalization (17) and the unit for MIMO control (18) are in each case connected to the electrical terminals (15) of the coupling elements (14).

2. The data transmission system (1) as claimed in claim 1 and wherein one of the plurality of transmission and reception units (3) couples the electromagnetic wave in or out, respectively, by means of field coupling or by means of galvanic coupling; and the rest of the others of the plurality of transmission and reception units (3) couple the electromagnetic wave in or out, respectively, by means of field coupling.

3. The data transmission system (1) as claimed in claim 1, And further comprising:

a recess (9) formed in the rail (4; $4_1$, $4_2$) starting from an outer surface of the rail (4; $4_1$, $4_2$) along a longitudinal extent of the rail (4; $4_1$, $4_2$).

4. The data transmission system (1) as claimed in claim 1, And wherein the coupling apparatus (13) has two coupling elements (14), and each coupling element (14) has an electrical terminal (15); and the two coupling elements (14) are two E-field coupling elements, or are two H-field coupling elements, or are a combination of one E-field coupling element and one H-field coupling element.

5. The data transmission system (1) as claimed in claim 4 and wherein the electrical terminals (15) of the two E-field coupling elements or, the electrical terminals (15) of the two H-field coupling elements are kept apart from one other by an axial distance of $\lambda/4 \cdot (2n+1)$ along the longitudinal extent of the rail (4; $4_1$, $4_2$), wherein $\lambda$ is the wavelength of the electromagnetic wave and n is an integer factor.

6. The data transmission system (1) as claimed in claim 5, And wherein the unit for MIMO control (18) is configured to inject a first electrical signal and a second electrical signal, respectively, into the electrical terminal (15) of the two coupling elements (14), and wherein the first electrical signal injected at a first coupling element (14) is phase-delayed by 90° with respect to the first electrical signal injected at a second coupling element (14); and the second electrical signal injected at the second coupling element (14) is phase-delayed by 90° with respect to the second electrical signal injected at the first coupling element (14).

7. The data transmission system (1) as claimed in claim 1, And wherein the coupling apparatus (13) with two electrical terminals (15) is a first electrical conductor of a directional coupler, and wherein the first electrical conductor of the directional coupler is coupled to at least one electrical conductor (5) serving as a second electrical conductor of the directional coupler.

8. The data transmission system (1) as claimed in claim 1 and wherein the electrical line has a plurality of rails ($4_1$, $4_2$), and each of the plurality of rails ($4_1$, $4_2$) is made of an electrically insulating material and the plurality of rails ($4_1$, $4_2$) can be connected to one other, end-to-end; and associated electrical conductors (5) which can be connected to one other.

9. The data transmission system (1) as claimed in claim 8 and further comprising:

a metallic sleeve (7) that electrically connects two electrical conductors (5); and the metallic sleeve (7) is resonantly coupled to the two electrical conductors (5), on an outer conductor side, of the plurality of rails ($4_1$, $4_2$) which can be connected to one other, end-to-end.

10. The data transmission system (1) as claimed in claim 9 and wherein on an inner conductor side, two electrical conductors (5) which can be connected to one other are electrically connected to a contact element (2) by way of a connecting element (20).

11. The data transmission system (1) as claimed in claim 9 and wherein two electrical conductors (5) are electrically connected to one other by an electrical conductor (5) that is formed axially extended with respect to the rail (4; $4_1$, $4_2$).

12. The data transmission system (1) as claimed in claim 1, And wherein the electrical line branches into at least two electrical lines; and wherein the rail (4; $4_1$, $4_2$) branches into at least two rails (4; $4_1$, $4_2$); and wherein the associated electrical conductors (5) in each case branch into at least two electrical conductors (5).

13. The data transmission system (1) as claimed in claim 1, And further comprising:

a shielding plate (25) that is arranged along the longitudinal extent of the rail (4; $4_1$, $4_2$) between a plurality of electrical conductors (5) or between a plurality of pairs (12) of electrical conductors (5).

14. The data transmission system (1) as claimed in claim 1 and wherein the coupling apparatus (13) has two coupling elements (14), and each of the two coupling elements (14) has an electrical terminal (15); and the two coupling elements (14) are two E-field coupling elements; or the two coupling elements (14) are two H-field coupling elements; or the two coupling elements (14) are a combination of one E-field coupling element and one H-field coupling element.

* * * * *